United States Patent [19]
Park

[11] Patent Number: 5,989,148
[45] Date of Patent: Nov. 23, 1999

[54] POWERTRAIN FOR 5-SPEED AUTOMATIC TRANSMISSIONS

[75] Inventor: Jongsool Park, Kyunggi-do, Rep. of Korea

[73] Assignee: Hyundai Motor Company, Seoul, Rep. of Korea

[21] Appl. No.: 08/998,653

[22] Filed: Dec. 29, 1997

[30] Foreign Application Priority Data

Oct. 8, 1997 [KR] Rep. of Korea ..................... 97-51611

[51] Int. Cl.⁶ .................................................. F16H 3/44
[52] U.S. Cl. ......................... 475/284; 475/276; 475/282; 475/286
[58] Field of Search ................................. 475/275, 276, 475/280, 282, 284, 286, 311, 317, 323

[56] References Cited

U.S. PATENT DOCUMENTS

| | | | |
|---|---|---|---|
| 3,946,624 | 3/1976 | Murakami et al. | 475/284 X |
| 4,027,552 | 6/1977 | Murakami et al. | 475/286 X |
| 4,038,887 | 8/1977 | Murakami et al. | 475/276 |
| 4,143,562 | 3/1979 | Murakami et al. | 475/276 |
| 4,223,571 | 9/1980 | Quemerais et al. | 475/276 |
| 4,395,925 | 8/1983 | Gaus | 475/284 X |
| 4,446,758 | 5/1984 | Winzeler et al. | 475/276 X |
| 4,683,776 | 8/1987 | Klemen | 475/286 |
| 5,246,409 | 9/1993 | Flemming et al. | 475/276 |
| 5,579,883 | 12/1996 | Tsukamoto et al. | 475/285 X |

*Primary Examiner*—Dirk Wright
*Assistant Examiner*—Peter T. Kwon
*Attorney, Agent, or Firm*—Finnegan, Henderson, Farabow, Garrett & Dunner, L.L.P.

[57] ABSTRACT

Disclosed is a powertrain used for a 5-speed automatic transmission. The powertrain includes a first compound planetary gearset and a second compound planetary gearset. The first compound planetary gearset comprises first and second simple planetary gearsets having first, second, third, and fourth operating elements, while the second compound planetary gearset comprises third and fourth simple planetary gearsets having fifth, sixth, seventh, and eighth operating elements. One of the fifth to eighth operating elements are fixedly connected to one of the first to fourth operating elements, one of the fifth to eighth operating elements are variably connected to two of the first to fourth operating elements, and one of the fifth to eighth operating elements operates as an output element. Clutches are disposed to variably connect the operating elements of the first and second compound planetary gearsets. A brake is interposed between at least one of the operating elements of the first and second compound planetary gearsets to a transmission housing.

100 Claims, 25 Drawing Sheets

FIG. 5

| Shift Range | | C1 | C2 | B1 | B2 |
|---|---|---|---|---|---|
| R | | | | ● | ● |
| D | 1 | ● | | ● | |
| | 2 | ● | | | ● |
| | 3 | ● | ● | | |
| | 4 | | ● | | ● |
| | 5 | | ● | ● | |

POWERTRAIN FOR 5-SPEED AUTOMATIC TRANSMISSIONS

FIELD OF THE INVENTION

The present invention relates to a powertrain for automatic transmissions, and more particularly, to a powertrain for a 5-speed automatic transmission which can be designed to be compact in size and lightweight by reducing the number of friction elements and planetary gearsets.

BACKGROUND OF THE INVENTION

Generally, automatic transmissions include a transmission control unit (TCU) for automatically controlling shift ratios according to variations in vehicle speed and load.

The TCU controls friction elements, a plurality of which are provided in a powertrain, to ON and OFF states to select one of the three elements of a planetary gearset (sun gear, ring gear, and planet carrier) to be an input element, another a reaction element, and the last an output element, thereby controlling the number of output revolutions.

To design a powertrain so that four forward speeds and one reverse speed can be output, one compound planetary gearset, comprised of two simple planetary gearsets, and at least five friction elements are used. The compound planetary gearset is structured such that elements from one planetary gearset are integrated or shared with elements from another planetary gearset.

However, the powertrain structured as in the above has the disadvantage of having a limited number of forward speeds, i.e., four. As a result, the powertrain can not make full use of the power provided by increasingly high-output engines. Also, the powertrain is not fuel efficient.

As a solution, there is provided a prior art powertrain having five forward speeds and one reverse speed. Such a powertrain is comprised of three simple planetary gearsets and at least six friction elements.

However, in such a powertrain for a 5-speed automatic transmission, to drive the vehicle in fourth or fifth-speed overdrive, there is a need for an element which rotates at a higher speed than that of a final output element. This results in a substantial amount of power loss. In addition, the large number of friction elements results in a heavy and large-size automatic transmission.

SUMMARY OF THE INVENTION

The present invention has been made in an effort to solve the above problems. It is an object of the present invention to provide a powertrain for a 5-speed automatic transmission which minimizes power loss by eliminating an element rotating faster than a final output element needed in the prior art when in overdrive.

It is another object of the present invention to provide a powertrain for a 5-speed automatic transmission which can be designed to be compact in size and lightweight by reducing the number of friction elements.

To achieve the above objects, the present invention provides a powertrain for a 5-speed automatic transmission including a first compound planetary gearset and a second compound planetary gearset. The first compound planetary gearset comprises first and second simple planetary gearsets having first, second, third, and fourth operating elements, while the second compound planetary gearset comprises third and fourth simple planetary gearsets having fifth, sixth, seventh, and eighth operating elements.

One of the fifth to eighth operating elements are fixedly connected to one of the first to fourth operating elements, one of the fifth to eighth operating elements are variably connected to two of the first to fourth operating elements, and one of the fifth to eighth operating elements operates as an output element.

Clutches are disposed to variably connect the operating elements of the first and second compound planetary gearsets. A brake is interposed between at least one of the operating elements of the first and second compound planetary gearsets to a transmission housing.

BRIEF DESCRIPTION OF THE DRAWINGS

These and other features, aspects, and advantages of the present invention will become better understood with regard to the following description, appended claims, and accompanying drawings where:

FIG. 5 is a chart illustrating the operation of friction elements in each shift range of a powertrain according to a preferred embodiment of the present invention;

DETAILED DESCRIPTION OF THE PREFERRED EMBODIMENTS

In the following detailed description, only the preferred embodiments of the invention have been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

Figure 1:
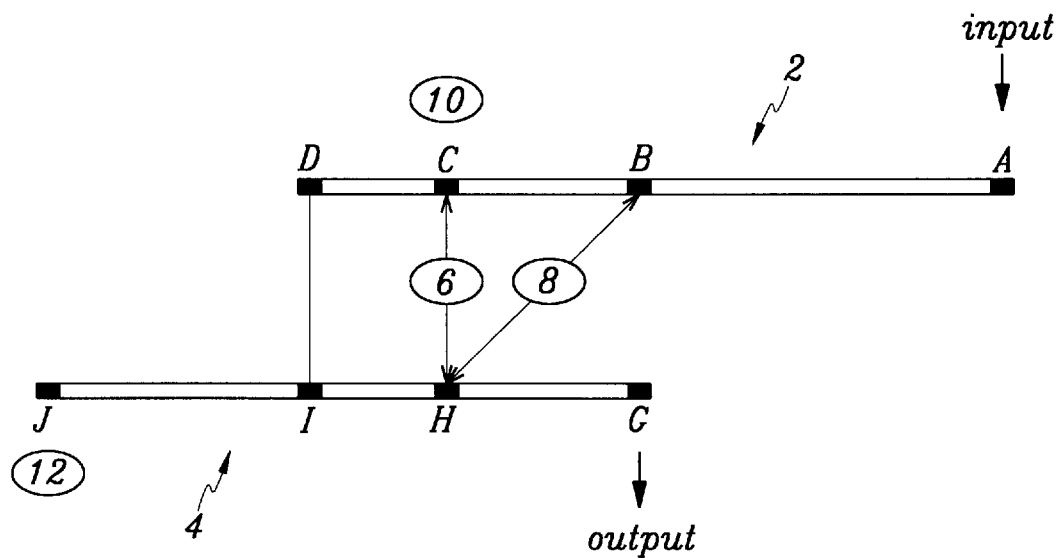
FIG. 1 is a lever analogy representation which can be obtained through powertrains according to various embodiments of the present invention.

Referring first to FIG. 1, shown is a lever analogy representation which can be obtained through powertrains according to various embodiments of the present invention. The inventive powertrain comprises first and second compound planetary gearsets 2 and 4, combined to realize five forward speeds and one reverse speed.

Each of the first and second compound planetary gearsets 2 and 4 is formed by the combination of two simple planetary gearsets, and each simple planetary gearset fixedly connects two operating elements for a total of eight operating elements arranged in two groups of four- A, B, C, D and G, H, I, J- for each of the compound planetary gearsets 2 and 4.

To combine the first and second compound planetary gearsets 2 and 4, one operating element of the first compound planetary gearset 2 is fixedly connected to one operating element of the second compound planetary gearset 4, and two of the operating elements of the first compound planetary gearset 2 are variably connected to one operating element of the second compound planetary gearset 4 through clutches.

Describing in more detail, a first operating element A of the first compound planetary gearset 2 operates as an input element, and a fourth operating element D of the first compound planetary gearset 2 is fixedly connected to a third operating element I of the second compound planetary gearset 4.

Further, a second operating element H of the second compound planetary gearset 4 is variably connected to a second operating element B of the second compound planetary gearset 4 through a second clutch 8, and to a third operating element C of the second compound planetary gearset 4 through a first clutch 6. A first operating element G of the second planetary gearset 4 acts as an output element.

In addition, the third operating element C of the first compound planetary gearset 2 and a fourth J operating element of the second compound planetary gearset 4 selectively act as reacting elements by first and second brakes 10 and 12, respectively.

Figure 2:
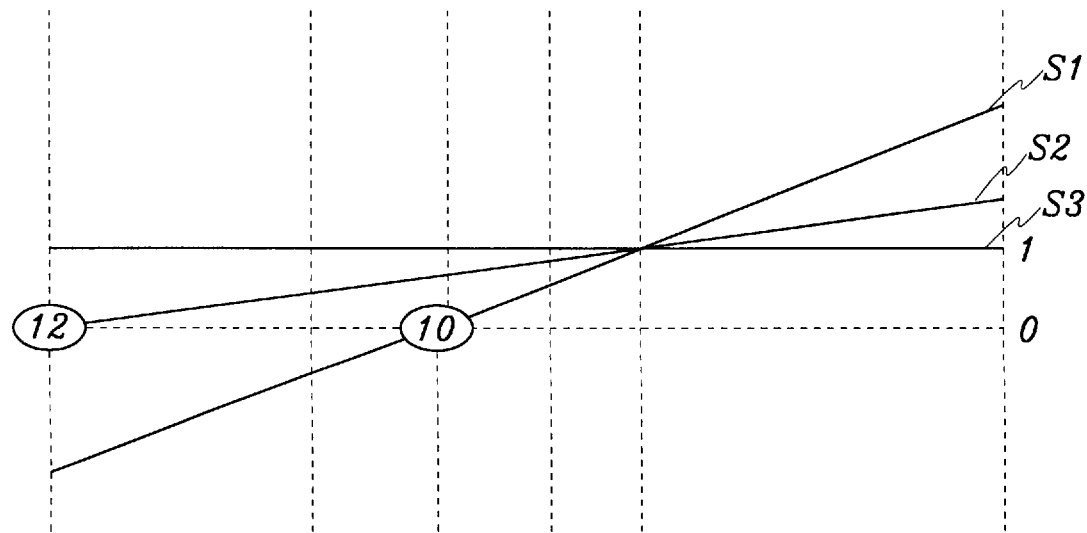
FIG. 2 is a schematic diagram illustrating an operation of forward first, second, and third speeds of a powertrain according to a preferred embodiment of the present invention through a lever analogy.

On the basis of the above description, the first and second compound planetary gearsets 2 and 4 can be merged into a single lever as shown in FIG. 2, the lever having first through fifth nodes N1, N2, N3, N4, and N5 representing the operating elements of the first and second compound planetary gearsets 2 and 4. The lever analogy in this drawing is used to illustrate the operation of the inventive powertrain in forward first, second, and third speeds, the first clutch 6 being engaged in all three of these speeds.

Describing in more detail with reference to the drawing, the first node N1 indicates the first operating element A of the first compound planetary gearset 2, the second node N2 indicates the second operating element B of the first compound planetary gearset 2 and the first operating element G of the second compound planetary gearset 4, the third node N3 indicates the third operating element C of the first compound planetary gearset 2 and the second operating element H of the second compound planetary gearset 4, the fourth node N4 indicates the fourth operating element D of the first compound planetary gearset 2 and the third operating element I of the second planetary gearset 4, and the fifth node N5 indicates the fourth operating element J of the second compound planetary gearset 4.

Figure 5:
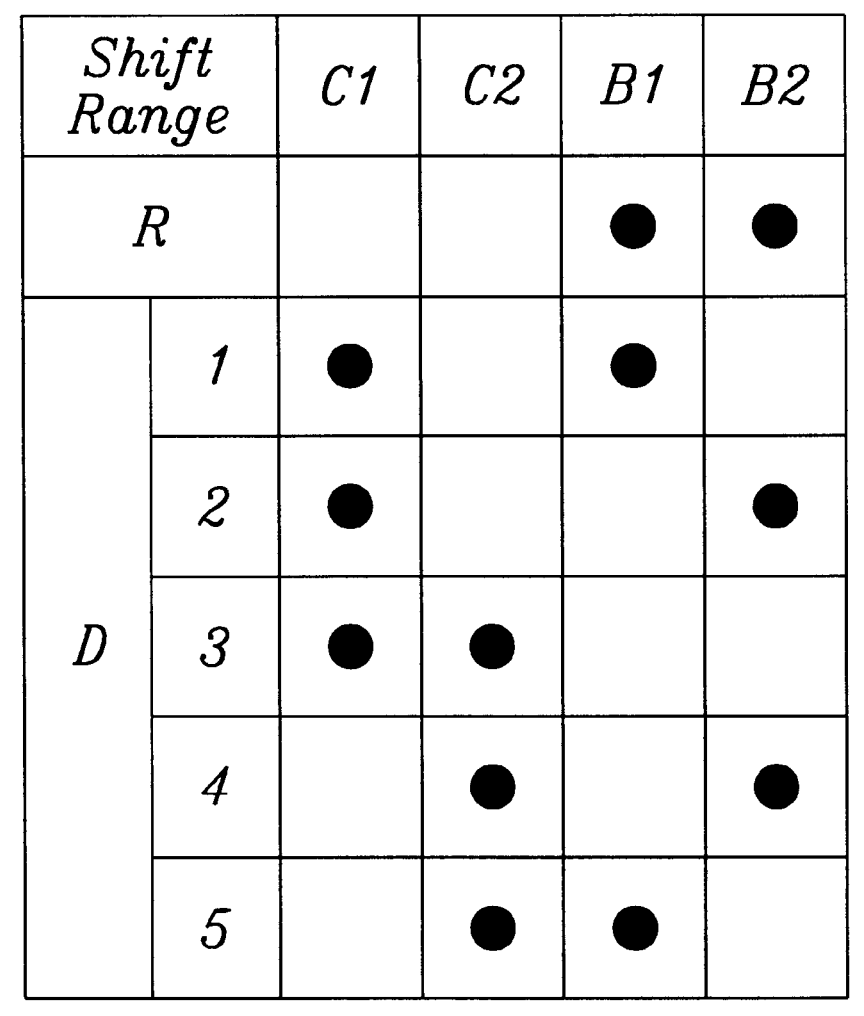

As shown in the chart of FIG. 5, illustrating the operation of friction elements in each shift range, in the forward first speed the first clutch 6 and the first brake 10 are engaged. Referring back to FIG. 2, in a state where input is realized through the first node N1, the third node N3 operates as a reacting element by the engagement of the first brake 10.

Also in FIG. 2, if assuming the number of output revolutions is "1", a line connecting the third node N3 (a reacting element) with the second node N2 (an output element) at this level of output revolutions becomes a first speed line S1. Accordingly, the number of revolutions input through the first node N1 is substantially higher than output revolutions.

Also, the operating elements of the fourth node N4 and that of the fifth node N5 rotate in a reverse direction in the first speed state.

Further, in the forward second speed the first brake 10 is disengaged, while the second brake 12 is operated (see FIG. 5). Here, in a state where input is realized through the first node N1, the fifth node N5 operates as a reacting element by the engagement of the second brake 12.

If assuming the number of output revolutions is "1", a line connecting the fifth node N5 (reacting element) to the second node N2 (output element) becomes a second speed line S2. As can be seen in line S2, the number of revolutions input through the first node N1 is somewhat lower compared to when in the first speed.

In the second speed state, the third and fourth nodes N3 and N4 rotate in the input direction at a number of revolutions less than that of the output.

In the forward third speed the second brake 12 is disengaged, while the second clutch 8 is operated such that the two clutches 6 and 8 are engaged in this speed (see FIG. 5). Here, in a state where input is realized through the first node N1, the first and second compound planetary gearsets 2 and 4 become locked in direct drive such that a 1:1 ratio is realized between input and output as shown by a third speed line S3. Namely, neither gear reduction nor overdrive occurs in the third speed.

In the forward fourth and fifth speeds, the first clutch 6 is disengaged, the second clutch 8 is engaged, and either the first or second brake 10 and 12 is engaged (see FIG. 5).

Figure 3:
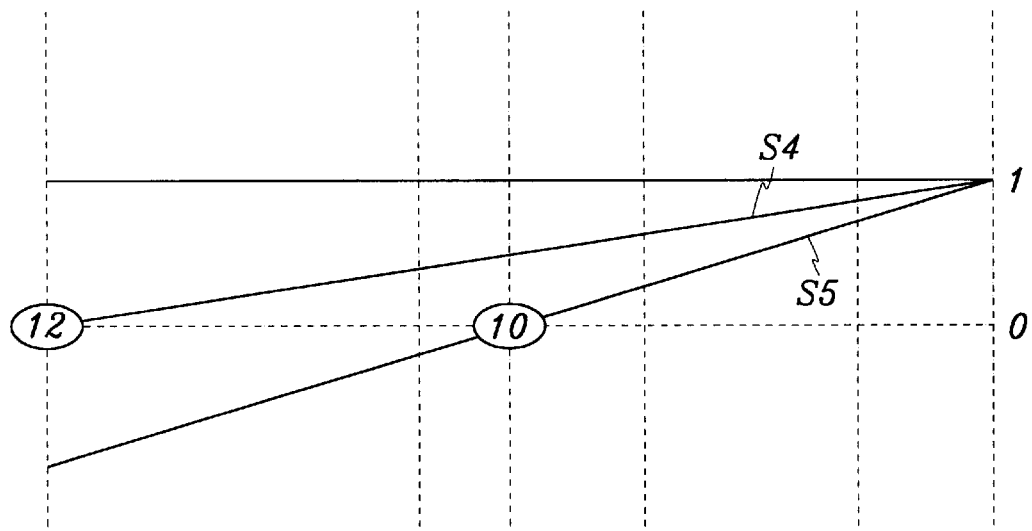
FIG. 3 is a schematic diagram illustrating an operation of forward fourth and fifth speeds of a powertrain according to a preferred embodiment of the present invention through a lever analogy.

Accordingly, the first and second compound planetary gearsets 2 and 4 can be merged into a single lever having first to sixth nodes N1, N2, N3, N4, N5, and N6 as shown in FIG. 3.

That is, in the lever of FIG. 3, the first node N1 indicates the first operating element G of the second compound planetary gearset 4, the second node N2 indicates the first operating element A of the first compound planetary gearset 2, the third node N3 indicates the second operating element B of the first compound planetary gearset 2 and the second operating element H of the second compound planetary gearset 4, the fourth node N4 indicates the third operating element C of the first compound planetary gearset 2, the fifth node N5 indicates the fourth operating element D of the first planetary gearset 2 and the third operating element I of the second compound planetary gearset 4, and the sixth node N6 indicates the fourth operating element J of the second planetary gearset 4.

Therefore, in the fourth speed, if assuming the number of output revolutions is "1" in a state where input is realized through the second node N2, a line connecting the sixth node N6, operating as a reacting element by the operation of the second brake 12, with the first node N1, which is an output element, becomes a fourth speed line S4. Accordingly, the number of revolutions input through the second node N2 is substantially lower than output revolutions, indicating the realization of an overdrive state.

Also, because the third, fourth, and fifth nodes N3, N4, and N5 rotate at a rate slower than the output, an operating element rotating faster than the output is not needed as in the prior art such that power loss is prevented.

In the forward fifth speed, the second brake 12 is disengaged, while the first brake 10 is engaged. Accordingly, in a state where input is realized through the second node N2, if assuming the number of output revolutions is "1", a line connecting the fourth node N4, operating as a reacting element by the operation of the first brake 10, with the first node N1, operating as an output element, becomes a fifth speed line S5. Here, a fifth speed state, or an overdrive state is realized as in the forward fourth speed.

In the reverse range, the first and second clutches 6 and 8 are disengaged, while both the first and second brakes 10 and 12 are engaged. Here, the first and second compound planetary gearsets 2 and 4 can be merged into a single lever having first to sixth nodes N1, N2, N3, N4, N5, and N6 as shown in FIG. 4.

Figure 4:
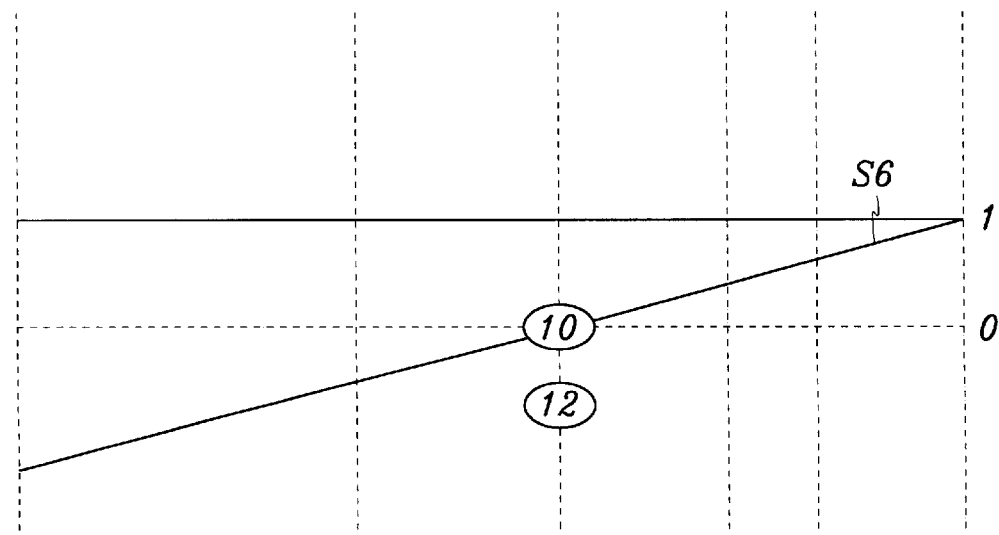
FIG. 4 is a schematic diagram illustrating an operation of a reverse speed of a powertrain according to a preferred embodiment of the present invention through a lever analogy.

Accordingly, as shown in the drawing, the third operating element C of the first compound planetary gearset 2 and the fourth operating element J of the second planetary gearset 4 act as reacting elements such that the first operating element A of the first compound planetary gearset 2 comes to be located at an opposite position in FIG. 4 when compared to the lever analogies of the forward speeds.

In the lever, the first node N1 indicates the first operating element G of the second compound planetary gearset 4, the second node N2 indicates the second operating element H of the second compound planetary gearset 4, the third node N3 indicates a combination of the fourth operating element D of the first compound planetary gearset 2 and the third operating element I of the second compound planetary gearset 4, the fourth node N4 indicates a combination of the third operating element C of the first compound planetary gearset 2 and the fourth operating element J of the second compound planetary gearset 4, the fifth node N5 indicates the second operating element B of the first planetary gearset 2, and the sixth node N6 indicates the first operating element A of the first planetary gearset 2.

Therefore, in the reverse range where input is realized through the sixth node N6 and the fourth node N4 acts as a reacting element by the engagement of the first and second brakes 10 and 12, if assuming the number of output revolutions is "1", a line connecting the fourth node N4, operating as a reacting element, with the first node N1, acting as an output element, becomes a reverse speed line S6.

In the FIG. 4, input below "0" does not indicate input in the reverse direction. This is merely a result of selecting the random number of output revolution of "1".

The embodiments of the present invention operating as in the above will be explained hereinafter with reference to the drawings.

First Embodiment

Figure 6:
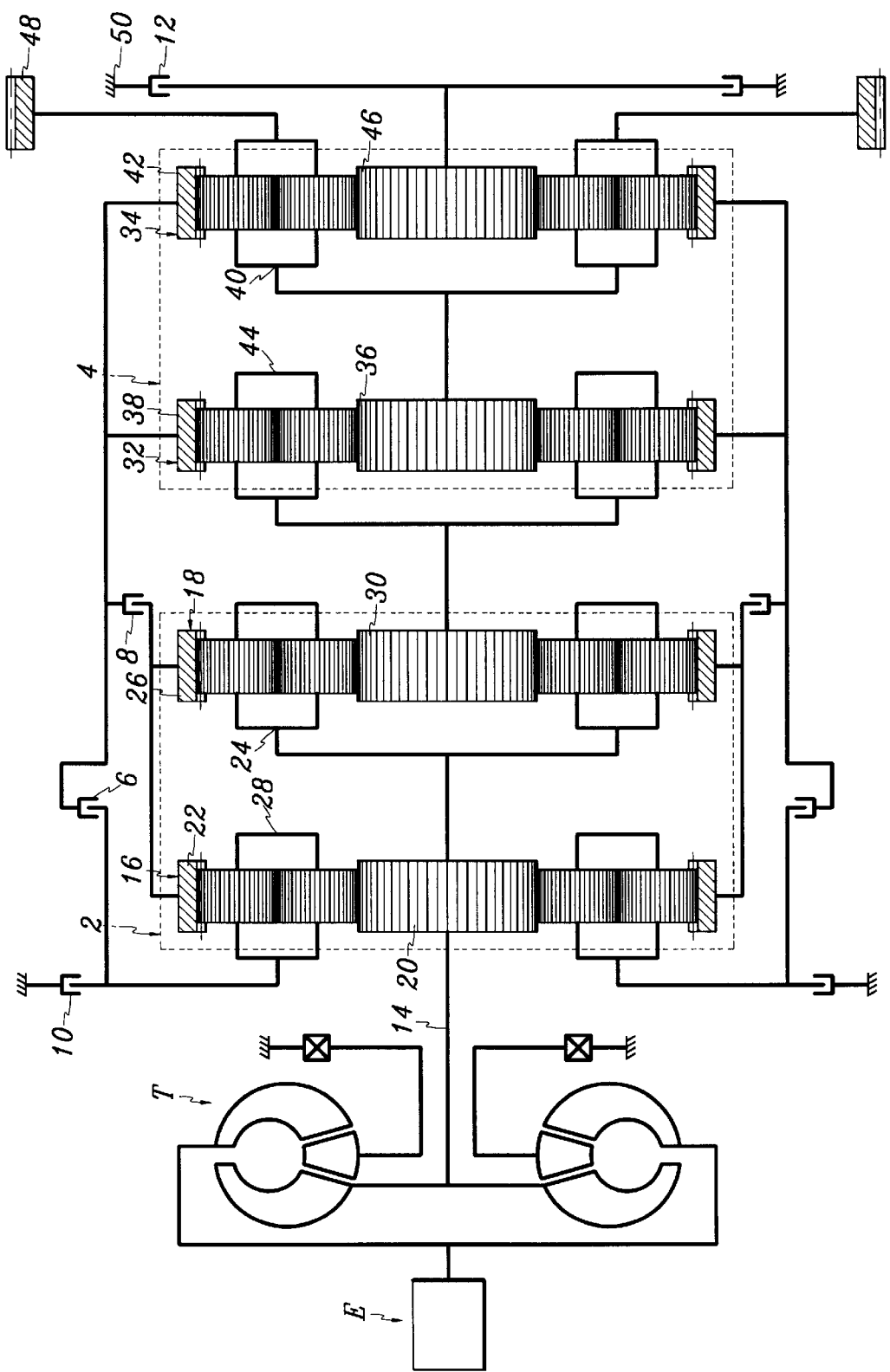
FIG. 6 is a schematic view of a powertrain according to a first preferred embodiment of the present invention.

Referring to FIG. 6, the inventive powertrain comprises an engine E for generating power, a torque converter T for multiplying torque generated from the engine E, and the first and second compound planetary gearsets 2 and 4 for receiving rotational power through an input shaft 14 and for outputting five forward speeds and one reverse speed.

The first compound planetary gearset 2 is realized through the combination of a first simple planetary gearset 16 and a second simple planetary gearset 18. In the present invention, the first and second simple planetary gearsets 16 and 18 are double pinion planetary gearsets.

A sun gear 20 and a ring gear 22 of the first simple planetary gearset 16 are fixedly connected respectively to a planet carrier 24 and a ring gear 26 of the second simple planetary gearset 18. Together with these two connections, and a planet carrier 28 of the first simple planetary gearset 16 and a sun gear 30 of the second simple planetary gearset 18, four operating elements are provided.

The second compound planetary gearset 4 is realized through the combination of a third simple planetary gearset 32 and a fourth simple planetary gearset 34, both of which are double pinion planetary gearsets.

A sun gear 36 and a ring gear 38 of the third simple planetary gearset 32 are fixedly connected respectively to a planet carrier 40 and a ring gear 42 of the fourth simple planetary gearset 34. Together with these two connections, and a planet carrier 44 of the third simple planetary gearset 32 and a sun gear 46 of the fourth simple planetary gearset 34, there are provided four operating elements.

With regard to the combination of the first and second compound planetary gearsets 2 and 4, the sun gear 30 of the second simple planetary gearset 18 is fixedly connected to the planet carrier 44 of the third simple planetary gearset 32, the planet carrier 28 of the first simple planetary gearset 16 is variably connected to both the ring gears 38 and 42 of the third and fourth simple planetary gearsets 32 and 34, and both the ring gears 22 and 26 of the first and second simple planetary gearsets 16 and 18 are variably connected to both the ring gears 38 and 42 of the third and fourth simple planetary gearsets 32 and 34.

Accordingly, the sun gear 20 and planet carrier 24 of the first and second simple planetary gearsets 16 and 18 act as input elements, while the sun gear 36 of the third simple planetary gearset 32, the planet carrier 40 of the fourth simple planetary gearset 34, and an output gear 48 act as an output element. This is made possible by the sun gear 36 of the third simple planetary gearset 32 being fixedly connected to the planet carrier 40 of the fourth simple planetary gearset 34, and the planet carrier 40 of the fourth simple planetary gearset 34 being integrally formed with the output gear 48.

Here, because the structure and operation of the output gear 48 is well known, i.e., its differential function through a final reduction gear, an explanation thereof and illustration in FIG. 6 have been omitted.

Further, the above variable connections are realized through first and second clutches 6 and 8. Namely, the first clutch 6 connects the planet carrier 28 of the first simple planetary gearset 16 to the ring gears 38 and 42 of the third and fourth planetary gearsets 32 and 36 when in the forward first, second, and third speeds; and the second clutch 8 connects the ring gears 22 and 26 of the first and second simple planetary gearsets 16 and 18 to the ring gears 38 and 42 of the third and fourth simple planetary gearsets 32 and 34 in the forward third, fourth, and fifth speeds.

Also, first and second brakes 10 and 12 are provided to selectively enable at least one of the operating elements of the first and second compound planetary gearsets 2 and 4 to act as a reaction element. Namely, the first brake 10 connects the planet carrier 28 of the first simple planetary gear set 16 to a transmission housing 50 in the forward first and fifth speeds and in reverse, and the second brake 12 connects the sun gear 46 of the fourth simple planetary gearset 34 to the transmission housing 50 in the forward second and fourth speeds and in reverse.

Referring back to FIG. 1, with regard to the first compound planetary gearset 2, the first operating element A indicates the sun gear 20 and planet carrier 24 of the first and second simple planetary gearsets 16 and 18, the second operating element B indicates the ring gears 22 and 26 of the first and second simple planetary gearset 22 and 26, the third operating element C indicates the planet carrier 28 of the first simple planetary gearset 18, and the fourth operating element D indicates the sun gear 30 of the second simple planetary gearsets 18.

With regard to the second compound planetary gearset 4, the first operating element G indicates the sun gear 36 and planet carrier 40 of the third and fourth simple planetary gearset 32 and 34, the second operating element H indicates the ring gears 38 and 42 of the third and fourth simple planetary gearsets 32 and 34, the third operating element I indicates the planet carrier 44 of the third simple planetary gearset 32, and the fourth operating element J indicates the sun gear 46 of the fourth simple planetary gearset 34.

The establishment of each operating element is determined by the type of planetary gear unit and connecting structure. In the above, as the determining of the structural elements of the first through fourth operating elements of the first and second planetary gearsets 2 and 4 by the combination of the first and second simple planetary gearsets 16 and 18, and the combination of the third and fourth simple planetary gearsets 32 and 34 is well known, a detailed description thereof is omitted.

The first and second compound planetary gearsets 2 and 4, each having four operating elements as in the above, can be merged into a single lever as shown in FIG. 2, the lever having first through fifth nodes N1, N2, N3, N4, and N5 representing the operating elements of the first and second compound planetary gearsets 2 and 4. The lever analogy in this drawing is used to illustrate the operation of the inventive powertrain in forward first, second, and third speeds, the first clutch 6 being engaged in all three of these speeds.

The breakdown of which operating elements each node represents is as follows: the first node N1 indicates the first operating element A of the first compound planetary gearset 2, the second node N2 indicates the second operating element B of the first compound planetary gearset 2 and the first operating element G of the second compound planetary gearset 4, the third node N3 indicates the third operating element C of the first compound planetary gearset 2 and the second operating element H of the second compound planetary gearset 4, the fourth node N4 indicates the fourth operating element D of the first compound planetary gearset 2 and the third operating element I of the second planetary gearset 4, and the fifth node N5 indicates the fourth operating element J of the second compound planetary gearset 4.

Forward First Speed

In the forward first speed, the first clutch 6 and the first brake 10 are engaged. Here, in a state where input is realized through the sun gear 20 and planet carrier 24 of the first and second simple planetary gearsets 16 and 18, or the first node N1, the planet carrier 28 of the first simple planetary gearset 16, or the third node N3, acts as a reaction element by the operation of the first brake 10.

Accordingly, as shown in FIG. 2, if assuming that the number of output revolutions is "1", the line connecting the third node N3, or reacting element, to the second node N2, or output element, becomes the first speed line S1 such that the number of revolutions input through the first node N1 is substantially higher than output revolutions.

Further, in such a first speed state, the operating elements represented by the fourth and fifth nodes N4 and N5 rotate in an opposite direction as the remaining operating elements, as shown by the fact that the line S1 corresponding to locations of the fourth and fifth nodes N4 and N5 extends beneath "0" in the drawing.

Forward Second Speed

In the forward second speed, the first brake 10 is disengaged, while the second brake 12 is engaged. Here, in a state where input is realized through the first node N1, the sun gear 46 of the fourth simple planetary gearset 34, or the fifth node N5 acts as a reaction element by the operation of the second brake 12.

Accordingly, as shown in FIG. 2, if assuming that the number of output revolutions is "1", the line connecting the fifth node N5, or reacting element, to the second node N2, or output element, becomes the second speed line S2 such that the number of revolutions input is less than that of the first speed.

Further, in the second speed state, although the operating elements of the third and fourth nodes N3 and N4 rotate in an identical direction with the input direction, they rotate at a speed slower than that of the output.

Forward Third Speed

In the forward third speed, the second brake 12 is disengaged, while the second clutch 8 is engaged such that both clutches 6 and 8 are operating. Here, in a state where input is realized through the first node N1, the first and second compound planetary gearsets 2 and 4 become locked in direct drive such that a 1:1 ratio is realized between input and output. That is, neither a state of gear reduction nor overdrive is realized.

Forward Fourth Speed

In the forward fourth and fifth speeds, the first clutch 6 is disengaged, the second clutch 8 is engaged, and either the first or second brake 10 and 12 is engaged. As a result, the second operating element B of the first compound planetary gearset 2 and the second operating element H of the second compound planetary gearset 4 are connected.

Accordingly, the first and second compound planetary gearsets 2 and 4 can be merged into a single lever having first to sixth nodes N1, N2, N3, N4, N5, and N6 as shown in FIG. 3. That is, in the lever of FIG. 3, the first node N1 indicates the first operating element G of the second compound planetary gearset 4, the second node N2 indicates the first operating element A of the first compound planetary gearset 2, the third node N3 indicates the second operating element B of the first compound planetary gearset 2 and the second operating element H of the second compound planetary gearset 4, the fourth node N4 indicates the third operating element C of the first compound planetary gearset 2, the fifth node N5 indicates the fourth operating element D of the first planetary gearset 2 and the third operating element I of the second compound planetary gearset 4, and the sixth node N6 indicates the fourth operating element J of the second planetary gearset 4.

Therefore, in the fourth speed, if assuming the number of output revolutions is "1" in a state where input is realized through the second node N2, a line connecting the sixth node N6, operating as a reacting element by the operation of the second brake 12, with the first node N1, operating as an output element, becomes a fourth speed line S4. Thus, as shown in the fourth speed line S4, the number of revolutions input through the second node N2 is substantially lower than output revolutions, indicating the realization of an overdrive state.

Also, in the fourth speed state, because the third, fourth, and fifth nodes N3, N4, and N5 rotate at a rate slower than the output, an operating element rotating faster than the output is not needed as in the prior art such that power loss is prevented.

Forward Fifth Speed

In the forward fifth speed, the second brake 12 is disengaged, while the first brake 10 is engaged. Accordingly, in a state where input is realized through the second node N2, if assuming the number of output revolutions is "1", a line connecting the fourth node N4, operating as a reacting element by the operation of the first brake 10, with the first node N1, operating as an output element, becomes a fifth speed line S5. Here, an overdrive state is realized as in the forward fourth speed.

Reverse

In the reverse range, the first and second clutches 6 and 8 are disengaged, while the first and second brakes 10 and 12 are engaged. Accordingly, as shown in FIG. 4, the third operating element C of the first compound planetary gearset 2 and the fourth operating element J of the second planetary gearset 4 become reacting elements such that the first operating element A of the first compound planetary gearset 2 comes to be located at an opposite position in the lever of FIG. 4, the lever having first to sixth nodes N1, N2, N3, N4, N5, and N6.

In the lever, the first node N1 indicates the first operating element G of the second compound planetary gearset 4, the second node N2 indicates the second operating element H of the second compound planetary gearset 4, the third node N3 indicates the fourth operating element D of the first compound planetary gearset 2 and the third operating element I of the second compound planetary gearset 4, the fourth node N4 indicates the third operating element C of the first compound planetary gearset 2 and the fourth operating element J of the second compound planetary gearset 4, the fifth node N5 indicates the second operating element B of the first planetary gearset 2, and the sixth node N6 indicates the first operating element A of the first planetary gearset 2.

Therefore, in the reverse range where input is realized through the sixth node N6 and the fourth node N4 acts as a reacting element by the engagement of the first and second brakes 10 and 12, if assuming the number of output revolutions is "1", a line connecting the fourth node N4, operating as a reacting element, with the first node N1 becomes a reverse speed line S6.

In FIG. 4, input below "0" does not indicate input in the reverse direction. This is merely a result of selecting the random number of output revolutions at "1".

Second Embodiment

Figure 7:
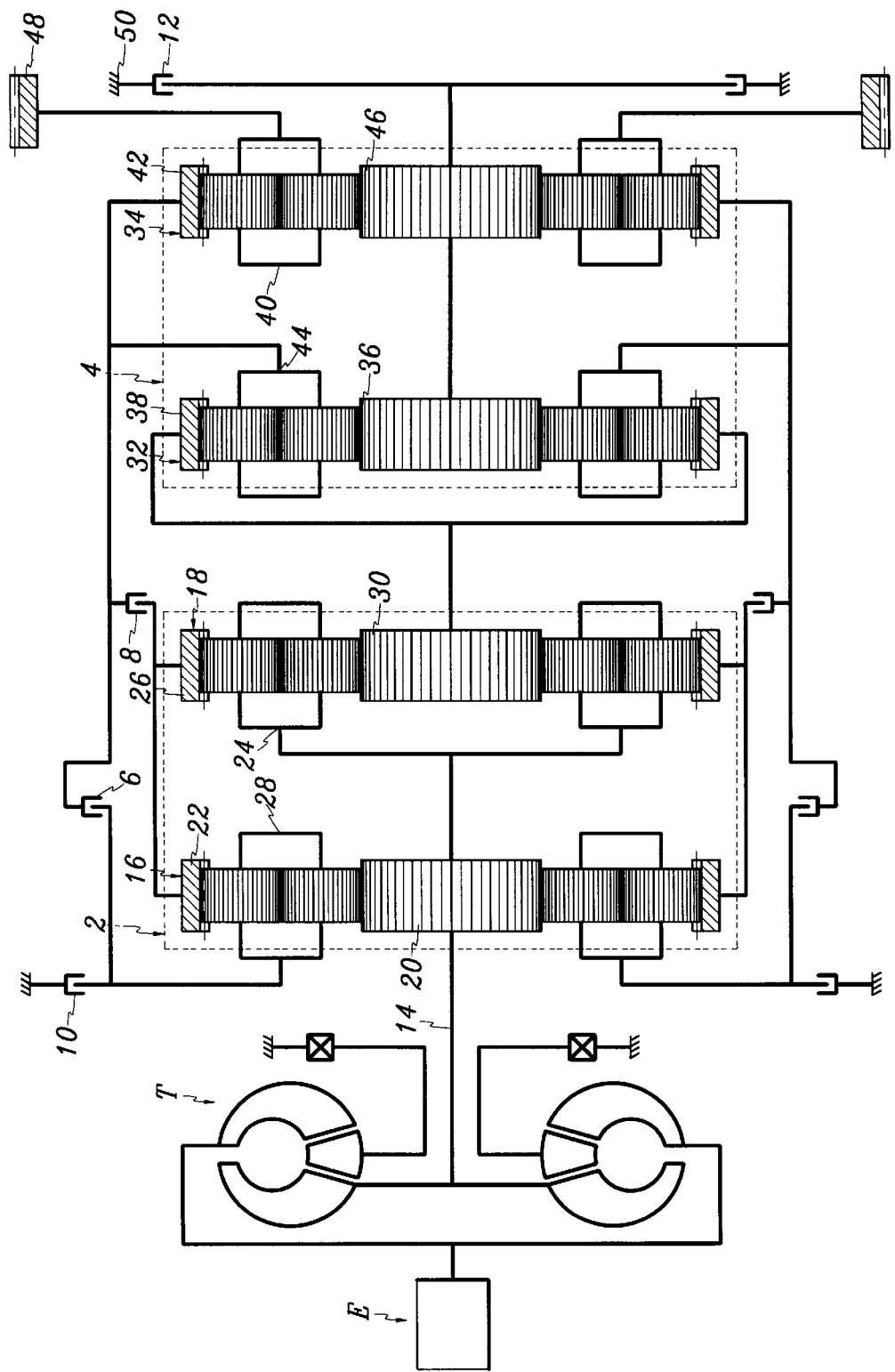
FIG. 7 is a schematic view of a powertrain according to a second preferred embodiment of the present invention.

Referring to FIG. 7, shown is a schematic view of a powertrain according to a second preferred embodiment of the present invention. As shown in the drawing, the sun gear 36 and planet carrier 44 of the third simple planetary gearset 32 are fixedly connected to the sun gear 46 and ring gear 42 of the fourth simple planetary gearset 34, respectively. In this embodiment, the third and fourth simple planetary gearsets 32 and 34 are double pinion planetary gearsets as in the first embodiment.

Further, with regard to the combination of the first and second compound planetary gearsets 2 and 4, the ring gear 38 of the third simple planetary gearset 32 is fixedly connected to the sun gear 30 of the second simple planetary gearset 18, and both the planet carrier 44 and ring gear 42 of the third and fourth simple planetary gearset 32 and 34 are variably connected to the planet carrier 28 of the first simple planetary gearset 16 through the first clutch 6, and to the ring gears 22 and 26 of the first and second simple planetary gearsets 16 and 18 through the second clutch 8.

Also, the sun gears 36 and 46 of the third and fourth simple planetary gearsets 32 and 34 are connected to the transmission housing 50 with the second brake 12 interposed therebetween such that the sun gears 36 and 46 can selectively act as reacting elements. In addition, the planet carrier 40 of the fourth simple planetary gearset 34 acts as an output element.

According to the above structure, operating elements for the second compound planetary gearset 4 in the lever analogies of FIGS. 1–4 are as follows: the first operating element G indicates the planet carrier 40 of the fourth simple planetary gearset 34, the second operating element H indicates the planet carrier 44 and ring gear 42 of the third and fourth simple planetary gearset 32 and 34, the third operating element I indicates the ring gear 38 of the third simple planetary gearset 32, and the fourth operating element J indicates the sun gears 36 and 46 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the second embodiment, only the structure of the second compound planetary gearset 4 is changed from the first embodiment. As the operation of the operating elements in each shift range is identical to that of the first embodiment, an explanation thereof will be omitted herein.

Third Embodiment

Figure 8:
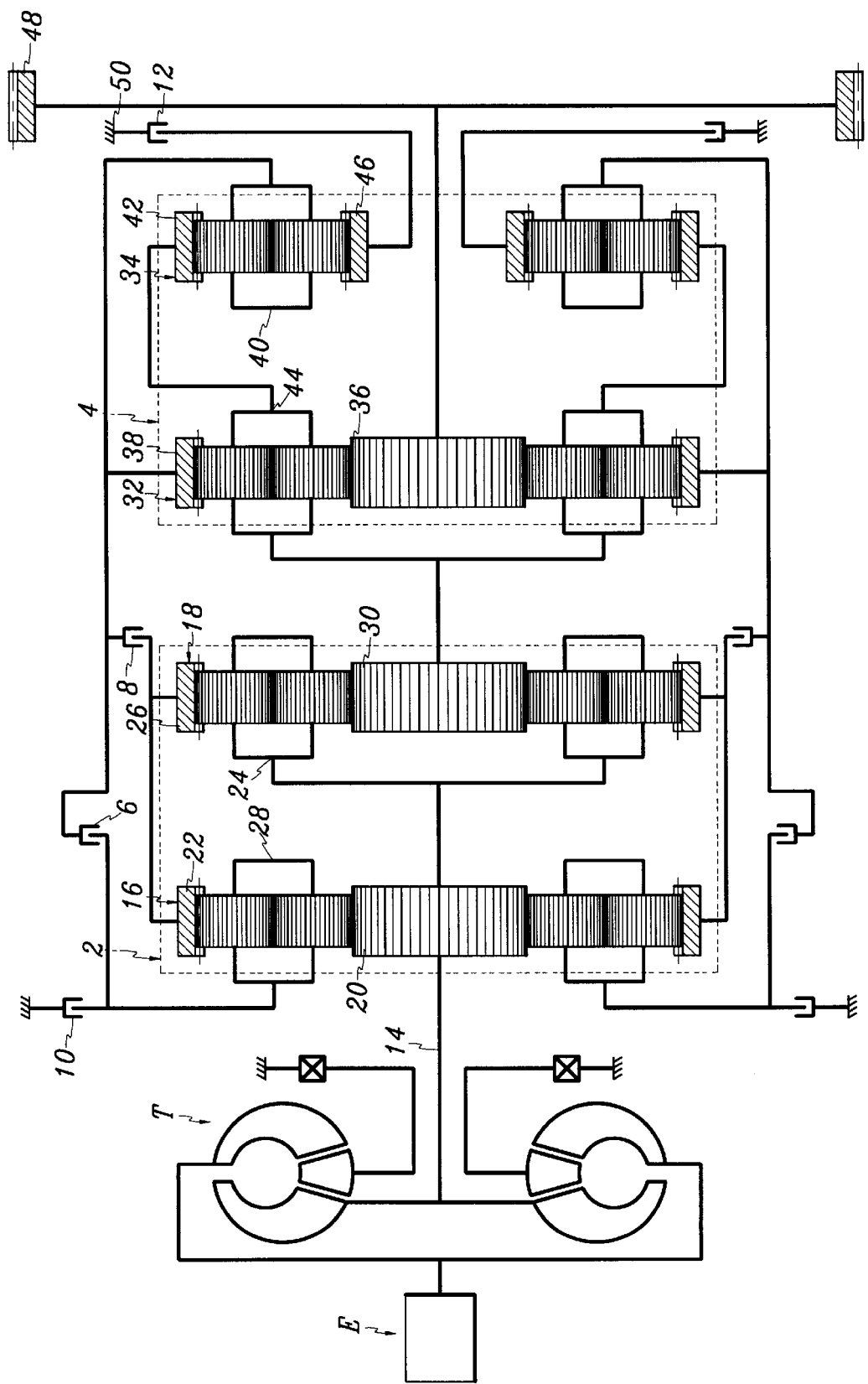
FIG. 8 is a schematic view of a powertrain according to third preferred embodiment of the present invention.

Referring to FIG. 8, shown is a schematic view of a powertrain according to a third preferred embodiment of the present invention. As shown in the drawing, the planet carrier 44 and ring gear 38 of the third simple planetary gearset 32 are fixedly connected to the ring gear 42 and planet carrier 40 of the fourth simple planetary gearset 34, respectively. In the third embodiment, the third and fourth simple planetary gearsets 32 and 34 are double pinion planetary gearsets as in the first embodiment.

Further, with regard to the combination of the first and second compound planetary gearsets 2 and 4, the planet carrier 44 and ring gear 42 of the third and fourth simple planetary gearsets 32 and 34 are fixedly connected to the sun gear 30 of the second simple planetary gearset 18, and both the ring gear 38 and planet carrier 40 of the third and fourth simple planetary gearset 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gear 36 of the third simple planetary gearset 32 acts as an output element.

According to the above structure, operating elements for the second compound planetary gearset 4 in the lever analogies of FIGS. 1–4 are as follows: the first operating element G indicates the sun gear 36 of the third simple planetary gearset 32, the second operating element H indicates the ring gear 38 and planet carrier 40 of the third and fourth simple planetary gearsets 32 and 34, the third operating element I indicates the planet carrier 44 and ring gear 42 of the third and fourth simple planetary gearsets 32 and 34, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the third embodiment, only the structure of the second compound planetary gearset 4 is changed from the first embodiment. As the operation of the operating elements in each shift range is identical to that of the first embodiment, an explanation thereof will be omitted herein.

Fourth Embodiment

Figure 9:
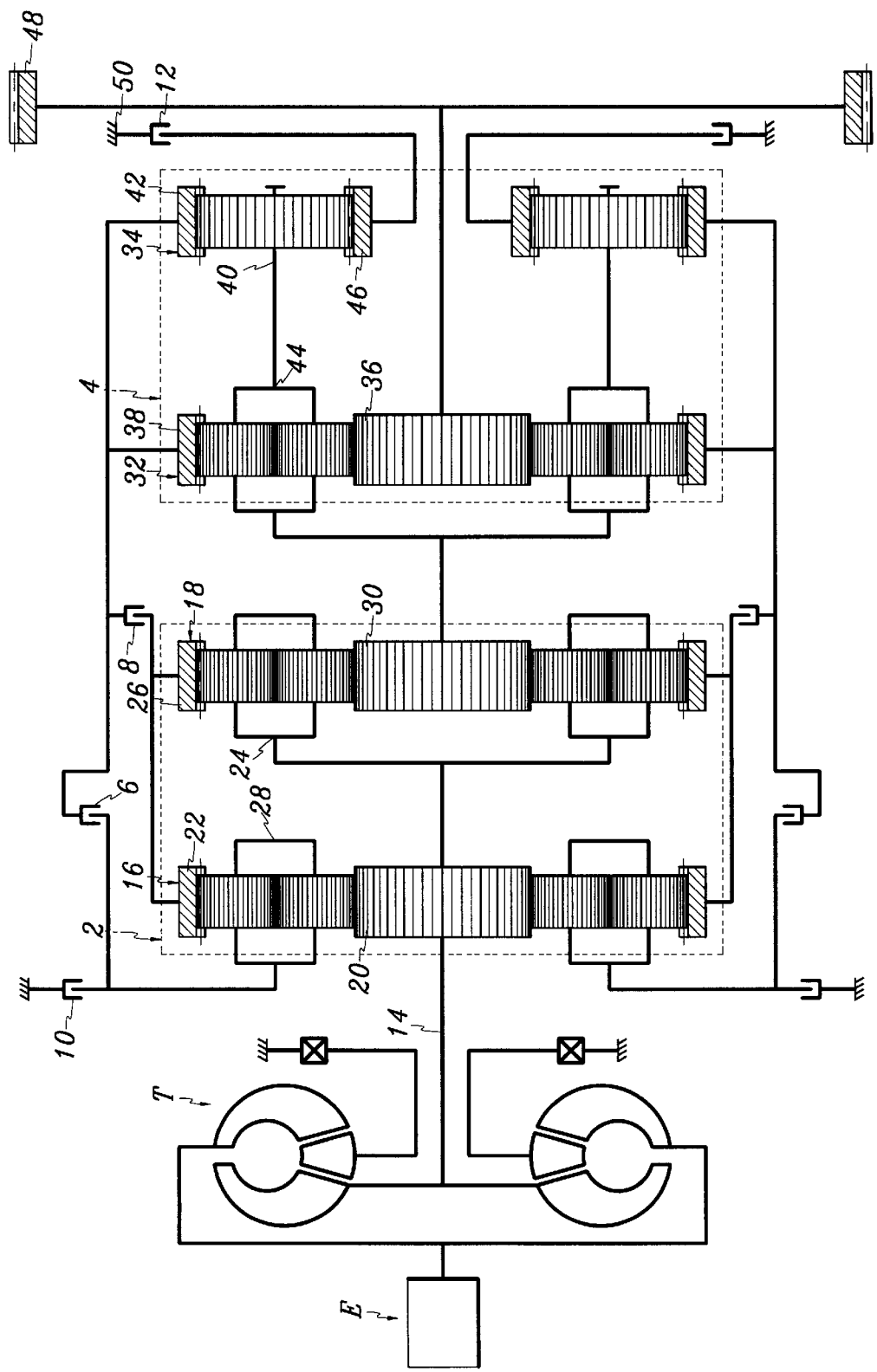
FIG. 9 is a schematic view of a powertrain according to a fourth preferred embodiment of the present invention.

Referring to FIG. 9, shown is a schematic view of a powertrain according to a fourth preferred embodiment of the present invention. As shown in the drawing, the second compound planetary gearset 4 is realized by the combination of the third simple planetary gearset 32, which is a double pinion planetary gearset as in the first embodiment, with the fourth simple planetary gearset 34, which is a single pinion planetary gearset in this embodiment. Namely, the planet carrier 44 and ring gear 38 of the third simple planetary gearset 32 are fixedly connected to the planet carrier 40 and ring gear 42 of the fourth simple planetary gearset 34, respectively.

Further, with regard to the combination of the first and second compound planetary gearsets 2 and 4, the planet carriers 44 and 40 of the third and fourth simple planetary gearsets 32 and 34 are fixedly connected to the sun gear 30 of the second simple planetary gearset 18, and both the ring gears 38 and 42 of the third and fourth simple planetary gearset 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gear 36 of the third simple planetary gearset 32 acts as an output element.

According to the above structure, operating elements for the second compound planetary gearset 4 in the lever analogies of FIGS. 1–4 are as follows: the first operating element G indicates the sun gear 36 of the third simple planetary gearset 32, the second operating element H indicates ring gears 38 and 42 of the third and fourth simple planetary gearsets 32 and 34, the third operating element I indicates the planet carriers 44 and 40 of the third and fourth simple planetary gearsets 32 and 34, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fourth embodiment, only the structure of the second compound planetary gearset 4 is changed from the first embodiment. As the operation of the operating elements in each shift range is identical to that of the first embodiment, an explanation thereof will be omitted herein.

Fifth Embodiment

Figure 10:
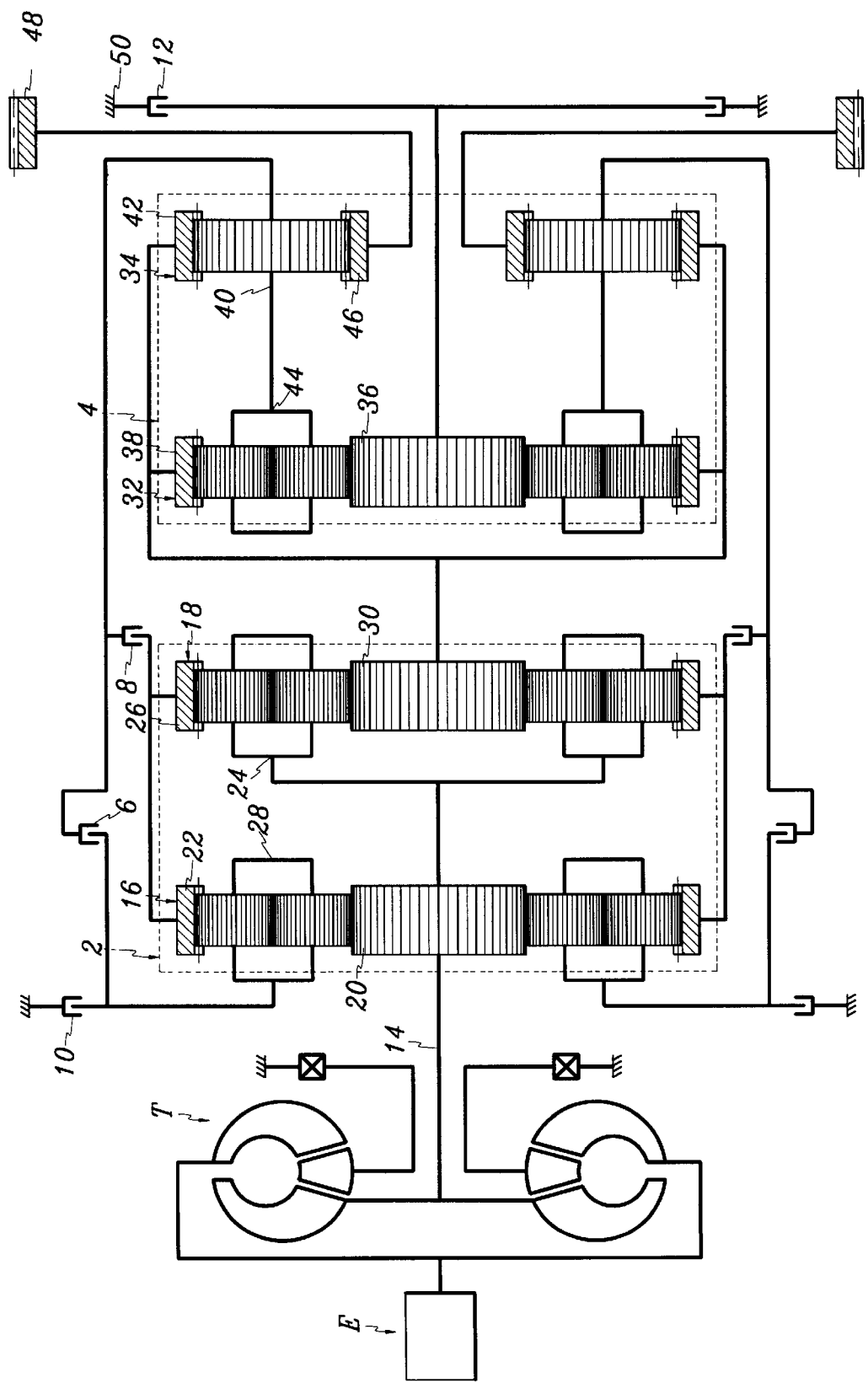
FIG. 10 is a schematic view of a powertrain according to a fifth preferred embodiment of the present invention.

Referring to FIG. 10, shown is a schematic view of a powertrain according to a fifth preferred embodiment of the present invention. As shown in the drawing, the planet carrier 44 and ring gear 38 of the third simple planetary gearset 32 are fixedly connected to the planet carrier 40 and ring gear 42 of the fourth simple planetary gearset 34, respectively. In the fifth embodiment, the third simple planetary gearset 32 is a double pinion planetary gearset as in the first embodiment, while the fourth simple planetary gearsets 34 is a single pinion planetary gearset in this embodiment.

Further, with regard to the combination of the first and second compound planetary gearsets 2 and 4, the ring gears 38 and 42 of the third and fourth simple planetary gearsets 32 and 34 are fixedly connected to the sun gear 30 of the second simple planetary gearset 18, and both the planet carriers 44 and 40 of the third and fourth simple planetary gearset 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 36 of the third simple planetary gearset 32 is connected to the transmission housing 50 with the second brake 12 interposed therebetween such that the sun gear 36 can selectively act as a reacting element. In addition, the sun gear 46 of the third simple planetary gearset 34 acts as an output element.

According to the above structure, operating elements for the second compound planetary gearset 4 in the lever analogies of FIGS. 1–4 are as follows: the first operating element G indicates the sun gear 46 of the third simple planetary gearset 34, the second operating element H indicates the planet carriers 44 and 40 of the third and fourth simple planetary gearsets 32 and 34, the third operating element I indicates the ring gears 38 and 42 of the third and fourth simple planetary agearsets 32 and 34, and the fourth operating element J indicates the sun gear 36 of the third simple planetary gearset 32.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fifth embodiment, only the structure of the second compound planetary gearset 4 is changed from the first embodiment. As the operation of the operating elements in each shift range is identical to that of the first embodiment, an explanation thereof will be omitted herein.

Sixth Embodiment

Figure 11:
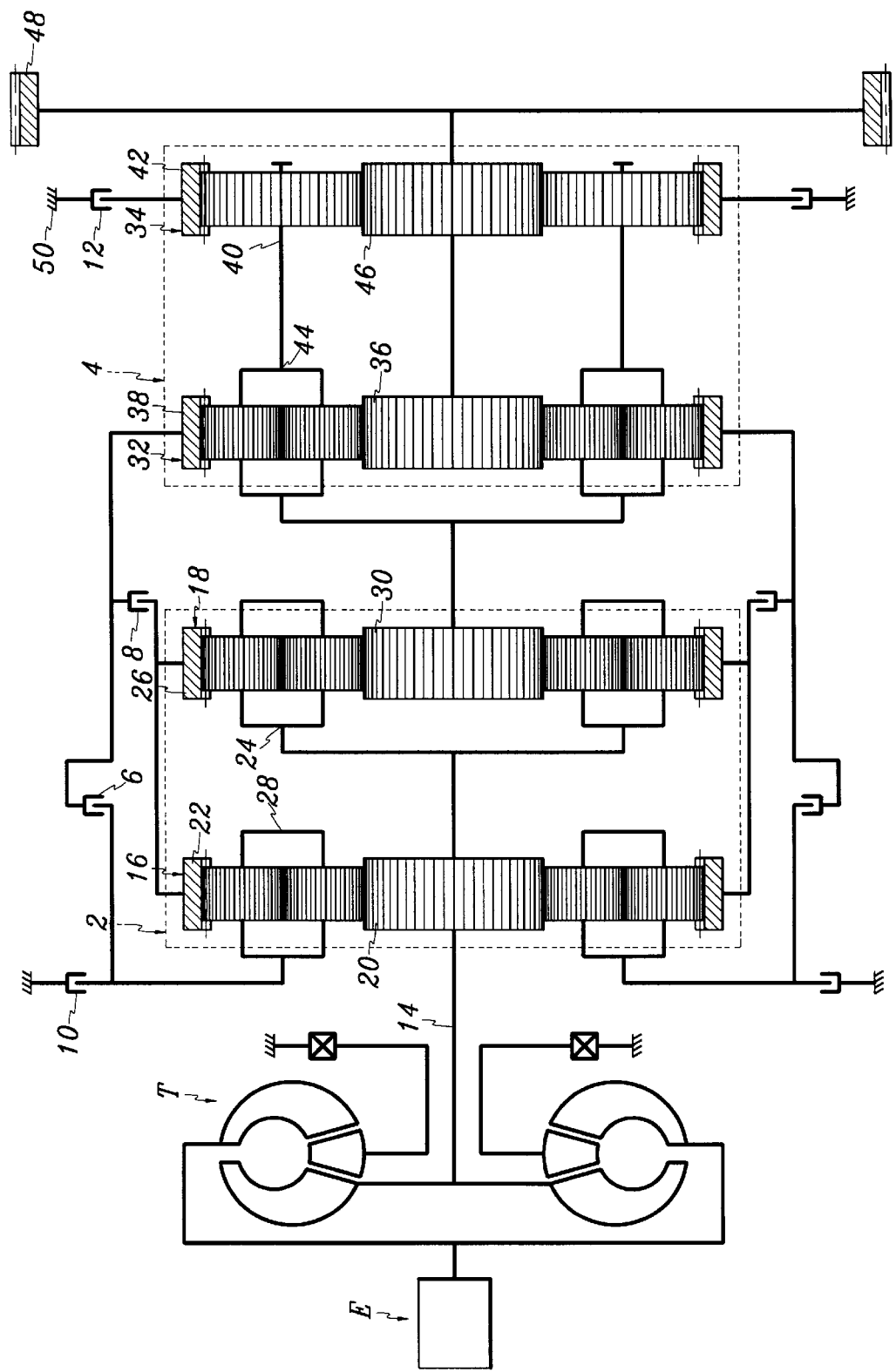
FIG. 11 is a schematic view of a powertrain according to sixth preferred embodiment of the present invention.

Referring to FIG. 11, shown is a schematic view of a powertrain according to a sixth preferred embodiment of the present invention. As shown in the drawing, the sun gear 36 and planet carrier 44 of the third simple planetary gearset 32 are fixedly connected to the sun gear 46 and planet carrier 40 of the fourth simple planetary gearset 34, respectively. In the sixth embodiment, the third simple planetary gearset 32 is a double pinion planetary gearset as in the first embodiment, while the fourth simple planetary gearset 34 is a single pinion planetary gearset in this embodiment.

Further, with regard to the combination of the first and second compound planetary gearsets 2 and 4, the planet carriers 44 and 40 of the third and fourth simple planetary gearsets 32 and 34 are fixedly connected to the sun gear 30 of the second simple planetary gearset 18, and the ring gear 38 of the third simple planetary gearset 32 is variably connected to the planet carrier 28 of the first simple planetary gearset 16 through the first clutch 6, and to both the ring gears 22 and 26 of the first and second simple planetary gearsets 16 and 18 through the second clutch 8.

Also, the ring gear 42 of the fourth simple planetary gearset 34 is connected to the transmission housing 50 with the second brake 12 interposed therebetween such that the ring gear 42 can selectively act as a reacting element. In addition, the sun gears 36 and 46 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gears 36 and 46 of the third and fourth simple planetary gearsets 32 and 34, the second operating element H indicates the ring gear 38 of the third simple planetary gearset 32, the third operating element I indicates the planet carriers 44 and 40 of the third and fourth simple planetary gearsets 32 and 34, and the fourth operating element J indicates the ring gear 42 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the sixth embodiment, only the structure of the second compound planetary gearset 4 is changed from the first embodiment. As the operation of the operating elements in each shift range is identical to that of the first embodiment, an explanation thereof will be omitted herein.

Seventh Embodiment

Figure 12:
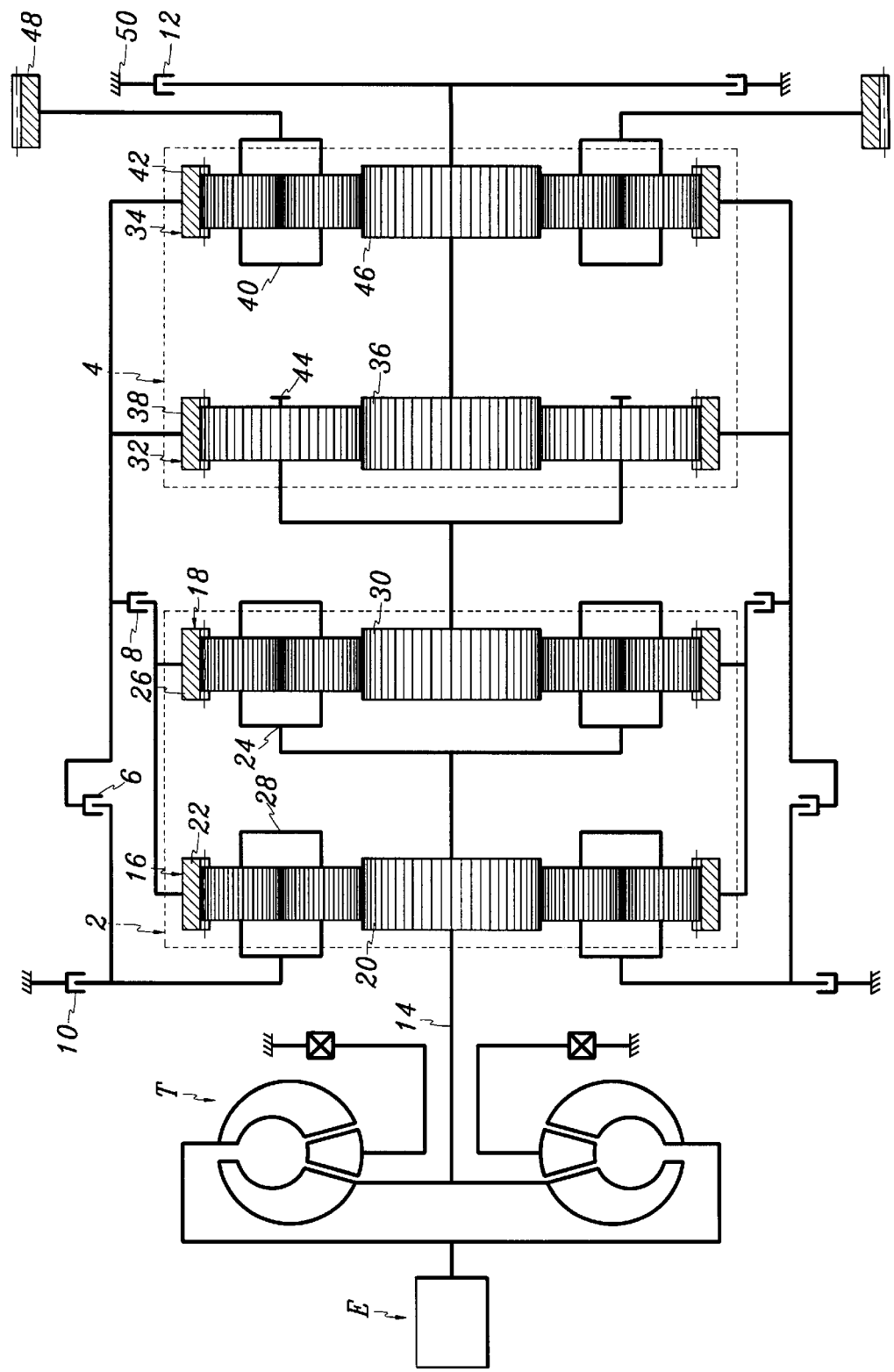
FIG. 12 is a schematic view of a powertrain according to a seventh preferred embodiment of the present invention.

Referring to FIG. 12, shown is a schematic view of a powertrain according to a seventh preferred embodiment of the present invention. As shown in the drawing, the second compound planetary gearset 4 is realized through the combination of the third simple planetary gearset 32, which is a single pinion planetary gearset in this embodiment, with the fourth simple planetary gearset 34, which is a double pinion planetary gearset as in the first embodiment. Namely, the sun gear 36 and ring gear 38 of the third simple planetary gearset 32 are fixedly connected to the sun gear 46 and ring gear 42 of the fourth simple planetary gearset 34, respectively.

Further, with regard to the combination of the first and second compound planetary gearsets 2 and 4, the planet carrier 44 of the third simple planetary gearset 32 is fixedly connected to the sun gear 30 of the second simple planetary gearset 18, and both the ring gears 38 and 42 of the third and fourth simple planetary gearsets 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gears 36 and 46 of the third and fourth simple planetary gearset 32 and 34 are connected to the transmission housing 50 with the second brake 12 interposed therebetween such that the sun gears 36 and 46 can selectively act as reacting elements. In addition, the planet carrier 40 of the fourth simple planetary gearset 34 acts as an output element.

According to the above structure, operating elements for the second compound planetary gearset 4 in the lever analogies of FIGS. 1–4 are as follows: the first operating element G indicates the planet carrier 40 of the fourth simple planetary gearset 34, the second operating element H indicates the ring gears 38 and 42 of the third and fourth simple planetary gearsets 32 and 34, the third operating element I indicates the planet carrier 44 of the third simple planetary gearset 32, and the fourth operating element J indicates the sun gears 36 and 46 of the third and fourth simple planetary gearset 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the seventh embodiment, only the structure of the second compound planetary gearset 4 is changed from the first embodiment. As the operation of the operating elements in each shift range is identical to that of the first embodiment, an explanation thereof will be omitted herein.

Eighth Embodiment

Figure 13:
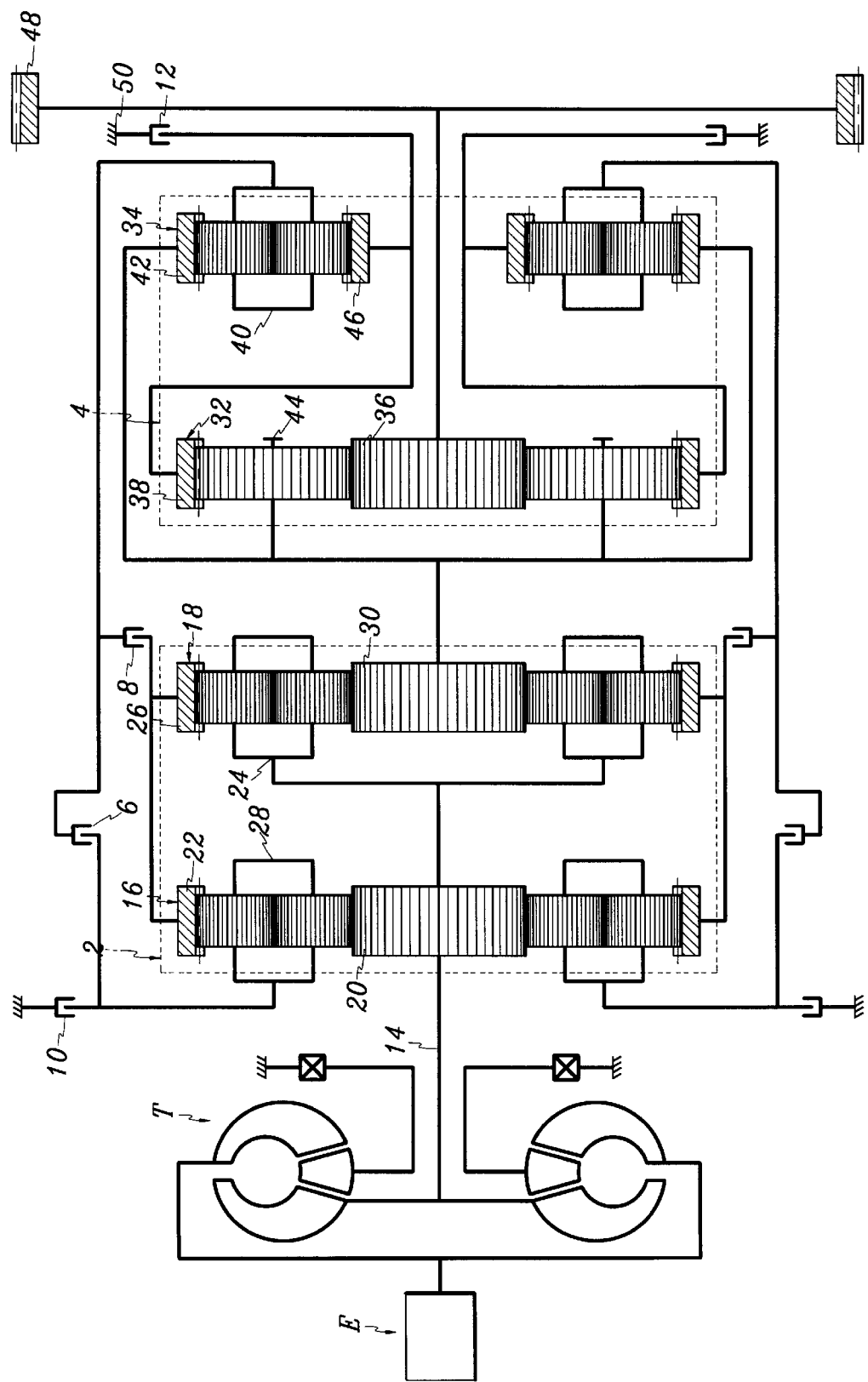
FIG. 13 is a schematic view of a powertrain according to a eighth preferred embodiment of the present invention.

Referring to FIG. 13, shown is a schematic view of a powertrain according to an eighth preferred embodiment of the present invention. As shown in the drawing, the second compound planetary gearset 4 is realized through the combination of the third simple planetary gearset 32, which is a single pinion planetary gearset in this embodiment, with the fourth simple planetary gearset 34, which is a double pinion planetary gearset as in the first embodiment. Namely, the planet carrier 44 and ring gear 38 of the third simple planetary gearset 32 are fixedly connected to the ring gear 42 and sun gear 46 of the fourth simple planetary gearset 34, respectively.

Further, with regard to the combination of the first and second compound planetary gearsets 2 and 4, the planet carrier 44 and ring gear 42 of the third and fourth simple planetary gearsets 32 and 34 are fixedly connected to the sun gear 30 of the second simple planetary gearset 18, and the planet carrier 40 of the fourth simple planetary gearset 34 is variably connected to the planet carrier 28 of the first simple planetary gearset 16 through the first clutch 6, and to both the ring gears 22 and 26 of the first and second simple planetary gearsets 16 and 18 through the second clutch 8.

Also, the ring gear 38 and sun gear 46 of the third and fourth simple planetary gearsets 32 and 34 are connected to the transmission housing 50 with the second brake 12 interposed therebetween such that the ring gear 38 and sun gear 46 can selectively act as reacting elements. In addition, the sun gear 36 of the third simple planetary gearset 32 acts as an output element.

According to the above structure, operating elements for the second compound planetary gearset 4 in the lever analogies of FIGS. 1–4 are as follows: the first operating element G indicates the sun gear 36 of the third simple planetary gearset 34, the second operating element H indicates the planet carrier 40 of the fourth simple planetary gearset 34, the third operating element I indicates the planet carrier 44 and ring gear 42 of the third and fourth simple planetary gearsets 32 and 34, and the fourth operating element J indicates the ring gear 38 and sun gear 46 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the eighth embodiment, only the structure of the second compound planetary gearset 4 is changed from the first embodiment. As the operation of the operating elements in each shift range is identical to that of the first embodiment, an explanation thereof will be omitted herein.

Ninth Embodiment

Figure 14:
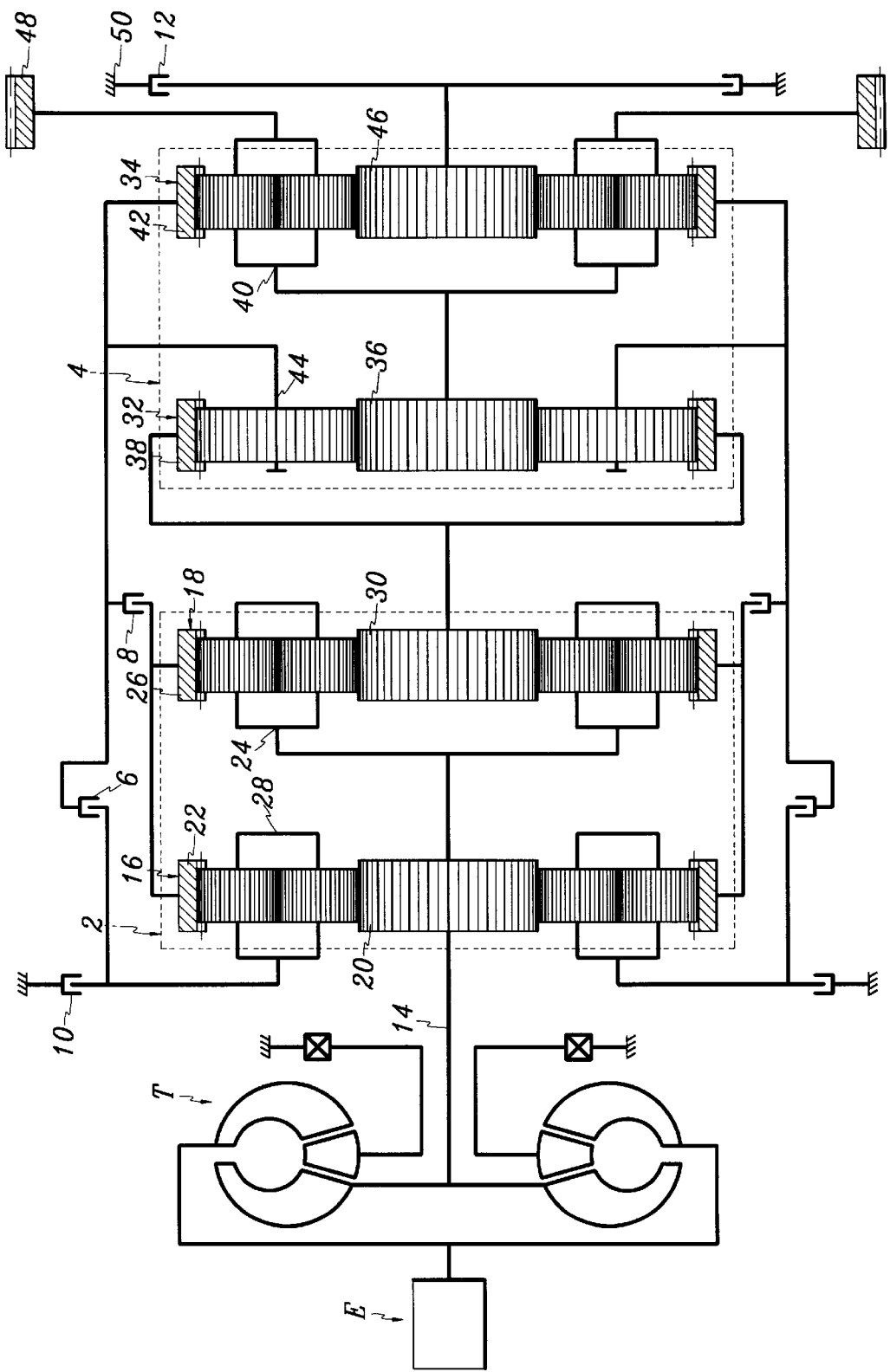
FIG. 14 is a schematic view of a powertrain according to a ninth preferred embodiment of the present invention.

Referring to FIG. 14, shown is a schematic view of a powertrain according to a ninth preferred embodiment of the present invention. As shown in the drawing, the second compound planetary gearset 4 is realized through the combination of the third simple planetary gearset 32, which is a single pinion planetary gearset in this embodiment, with the fourth simple planetary gearset 34, which is a double pinion planetary gearset as in the first embodiment. Namely, the planet carrier 44 and sun gear 36 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the ring gear 38 of the third simple planetary gearset 32 is fixedly connected to the sun gear 30 of the second simple planetary gearset 18, and both the planet carrier 44 and ring gear 42 of the third and fourth simple planetary gearsets 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gear 36 and planet carrier 40 of the third and fourth simple planetary gearsets 32 and 34 act as output elements.

According to the above structure, operating elements for the second compound planetary gearset 4 in the lever analogies of FIGS. 1–4 are as follows: the first operating element G indicates the sun gear 36 and planet carrier 40 of the third and fourth simple planetary gearsets 32 and 34, the second operating element H indicates the planet carrier 44 and ring gear 42 of the third and fourth simple planetary gearsets 32 and 34, the third operating element I indicates the ring gear 38 of the third simple planetary gearset 32, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the ninth embodiment, only the structure of the second compound planetary gearset 4 is changed from the first embodiment. As the operation of the operating elements in each shift range is identical to that of the first embodiment, an explanation thereof will be omitted herein.

Tenth Embodiment

Figure 15:
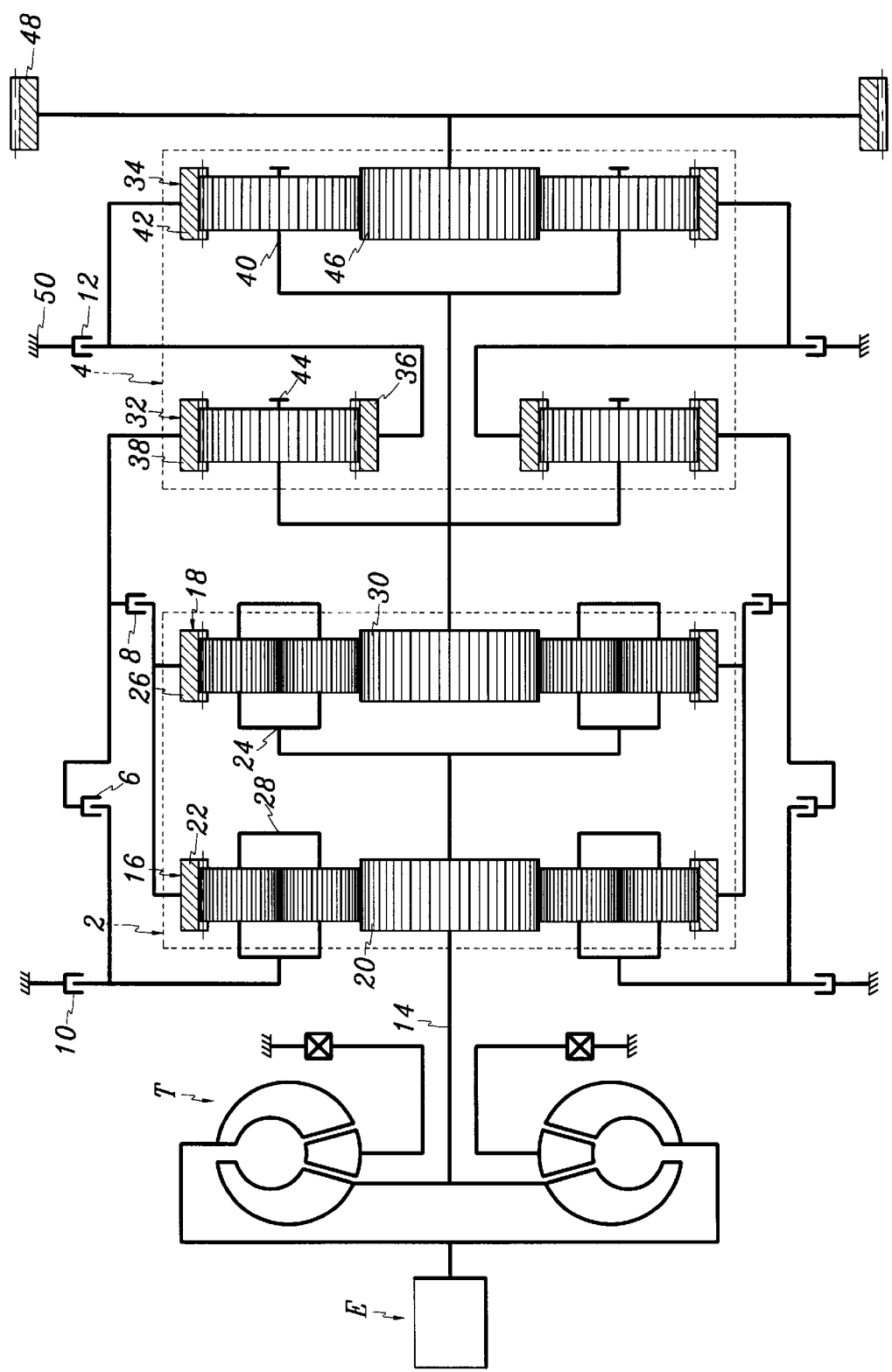
FIG. 15 is a schematic view of a powertrain according to a tenth preferred embodiment of the present invention.

Referring to FIG. 15, shown is a schematic view of a powertrain according to a tenth preferred embodiment of the present invention. As shown in the drawing, the second compound planetary gearset 4 is realized through the combination of the third and fourth simple planetary gearsets 32 and 34, both of which are single pinion planetary gearsets in this embodiment. Namely, the sun gear 36 and planet carrier 44 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the planet carriers 44 and 40 of the third and fourth simple planetary gearsets 32 and 34 are fixedly connected to the sun gear 30 of the second simple planetary gearset 18, and the ring gear 38 of the third simple planetary gearset 32 is variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 36 and ring gear 42 of the third and fourth simple planetary gearsets 32 and 34 are connected to the transmission housing 50 with the second brake 12 interposed therebetween such that the sun gear 36 and ring gear 42 can selectively act as reacting elements. In addition, the sun gear 46 of the fourth simple planetary gearset 34 acts as an output element.

According to the above structure, operating elements for the second compound planetary gearset 4 in the lever analogies of FIGS. 1–4 are as follows: the first operating element G indicates the sun gear 46 of the fourth simple planetary gearset 34, the second operating element H indicates the ring gear 38 of the third simple planetary gearset 32, the third operating element I indicates the planet carriers 44 and 40 of the third and fourth simple planetary gearsets 32 and 34, and the fourth operating element J indicates the sun gear 36 and ring gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the tenth embodiment, only the structure of the second compound planetary gearset 4 is changed from the first embodiment. As the operation of the operating elements in each shift range is identical to that of the first embodiment, an explanation thereof will be omitted herein.

Eleventh Embodiment

Figure 16:
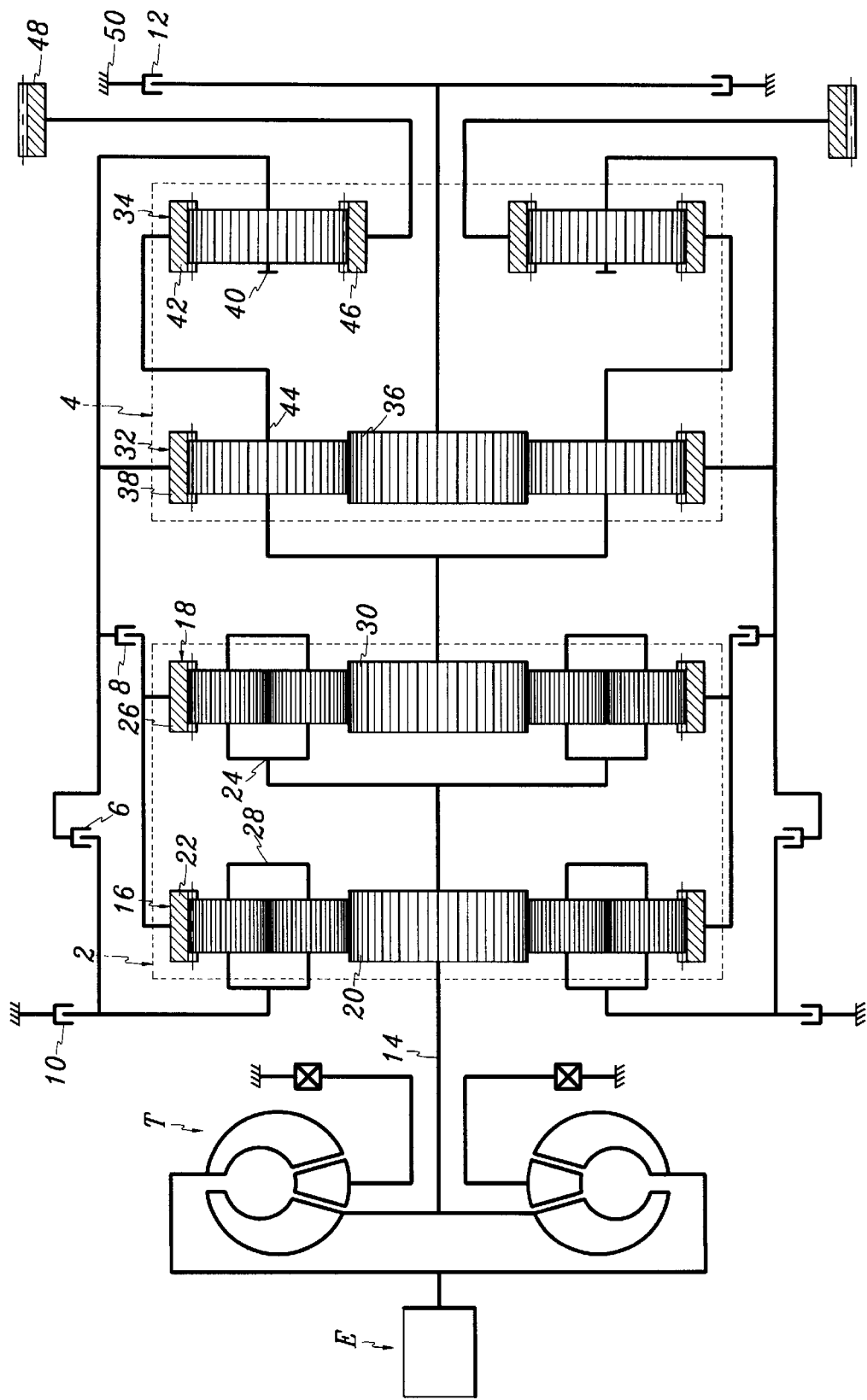
FIG. 16 is a schematic view of a powertrain according to a eleventh preferred embodiment of the present invention.

Referring to FIG. 16, shown is a schematic view of a powertrain according to an eleventh preferred embodiment of the present invention. As shown in the drawing, the second compound planetary gearset 4 is realized through the combination of the third and fourth simple planetary gearsets 32 and 34, both of which are single pinion planetary gearsets in this embodiment. Namely, the planet carrier 44 and ring gear 38 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the planet carrier 44 and ring gear 42 of the third and fourth simple planetary gearsets 32 and 34 are fixedly connected to the sun gear 30 of the second simple planetary gearset 18, and both the ring gear 38 and planet carrier 40 of the third and fourth simple planetary gearsets 32 and 34 are variably connected to the planet carrier 28 of the first simple planetary gearset 16 through the first clutch 6, and to both the ring gears 22 and 26 of the first and second simple planetary gearsets 16 and 18 through the second clutch 8.

Also, the sun gear 36 of the third simple planetary gearset 32 is connected to the transmission housing 50 with the second brake 12 interposed therebetween such that the sun gear 36 can selectively act as a reacting element. In addition, the sun gear 46 of the fourth simple planetary gearset 34 acts as an output element.

According to the above structure, operating elements for the second compound planetary gearset 4 in the lever analogies of FIGS. 1–4 are as follows: the first operating element G indicates the sun gear 46 of the fourth simple planetary gearset 34, the second operating element H indicates the ring gear 38 and planet carrier 40 of the third and fourth simple planetary gearsets 32 and 34, the third operating element I indicates the planet carrier 44 and ring gear 42 of the third and fourth simple planetary gearsets 32 and 34, and the fourth operating element J indicates the sun gear 36 of the third simple planetary gearset 32.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the eleventh embodiment, only the structure of the second compound planetary gearset 4 is changed from the first embodiment. As the operation of the operating elements in each shift range is identical to that of the first embodiment, an explanation thereof will be omitted herein.

Twelfth Embodiment

Figure 17:
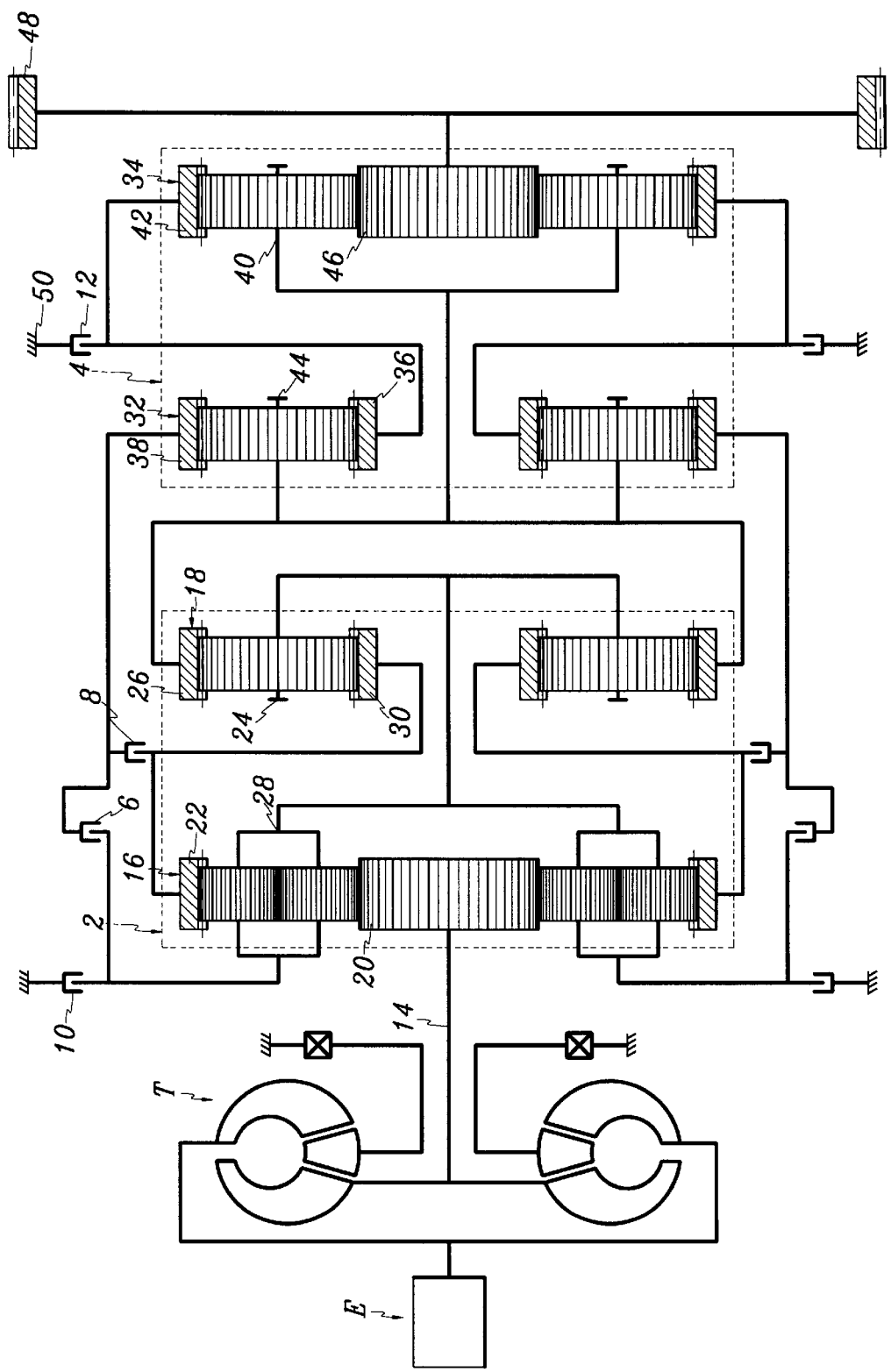
FIG. 17 is a schematic view of a powertrain according to a twelfth preferred embodiment of the present invention.

Referring to FIG. 17, shown is a schematic view of a powertrain according to a twelfth preferred embodiment of the present invention. In the twelfth embodiment, the first compound planetary gearset 2 is realized through the combination of the first simple planetary gearset 16, which is a double pinion planetary gearset as in the first embodiment, with the second simple planetary gearset 18, which is a single pinion planetary gearset in this embodiment. The second compound planetary gearset 4 in the twelfth embodiment is realized through the combination of the third and fourth simple planetary gearsets 32 and 34, both of which are single pinion planetary gearsets in this embodiment.

Namely, with regard to the first compound planetary gearset 2, the planet carrier 28 and ring gear 22 of the first simple planetary gearset 2 are fixedly connected respectively to the planet carrier 24 and sun gear 30 of the second simple planetary gearset 18. With regard to the second compound planetary gearset 4, the sun gear 36 and planet carrier 44 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the planet carriers 44 and 40 of the third and fourth simple planetary gearsets 32 and 34 are fixedly connected to the ring gear 26 of the second simple planetary gearset 18, and the ring gear 38 of the third simple planetary gearset 32 is variably connected to both the planet carriers 28 and 24 of the first and simple planetary gearsets 16 and 18 through the first clutch 6, and to both the ring gear 22 and sun gear 30 of the first and second simple planetary gearsets 16 and 18 through the second clutch 8.

Also, the planet carriers 28 and 24 of the first and second simple planetary gearsets 16 and 18 are connected to the transmission housing 50 with the first brake 10 interposed therebetween, and the sun gear 36 and ring gear 42 of the third and fourth simple planetary gearsets 32 and 34 are connected to the transmission housing 50 with the second brake 12 interposed therebetween such that the planet carriers 28 and 24, sun gear 36, and ring gear 42 can selectively act as reacting elements. In addition, the sun gear 20 of the first simple planetary gearset 16 acts as an input element, and the sun gear 46 of the fourth simple planetary gearset 34 acts as an output element.

According to the above structure, operating elements for the first compound planetary gearset 2 in the lever analogies of FIGS. 1–4 are as follows: the first operating element A indicates the sun gear 20 of the first simple planetary gearset 16, the second operating element B indicates the ring gear 22 and sun gear 30 of the first and second simple planetary gearsets 16 and 18, the third operating element C indicates the planet carriers 28 and 24 of the first and second simple planetary gearsets 16 and 18, and the fourth operating element D indicates the ring gear 26 of the second simple planetary gearset 18.

The operating elements for the second compound planetary gearset 4 in the lever analogies of FIGS. 1–4 are as follows: the first operating element G indicates the sun gear 46 of the fourth simple planetary gearset 34, the second operating element H indicates the ring gear 38 of the third simple planetary gearset 32, the third operating element I indicates the planet carriers 44 and 40 of the third and fourth simple planetary gearsets 32 and 34, and the fourth operating element J indicates the sun gear 36 and ring gear 42 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the twelfth embodiment, only the structure of the first and second compound planetary gearsets 2 and 4 is changed from the first embodiment. As the operation of the operating elements in each shift range is identical to that of the first embodiment, an explanation thereof will be omitted herein.

Thirteenth Embodiment

Figure 18:
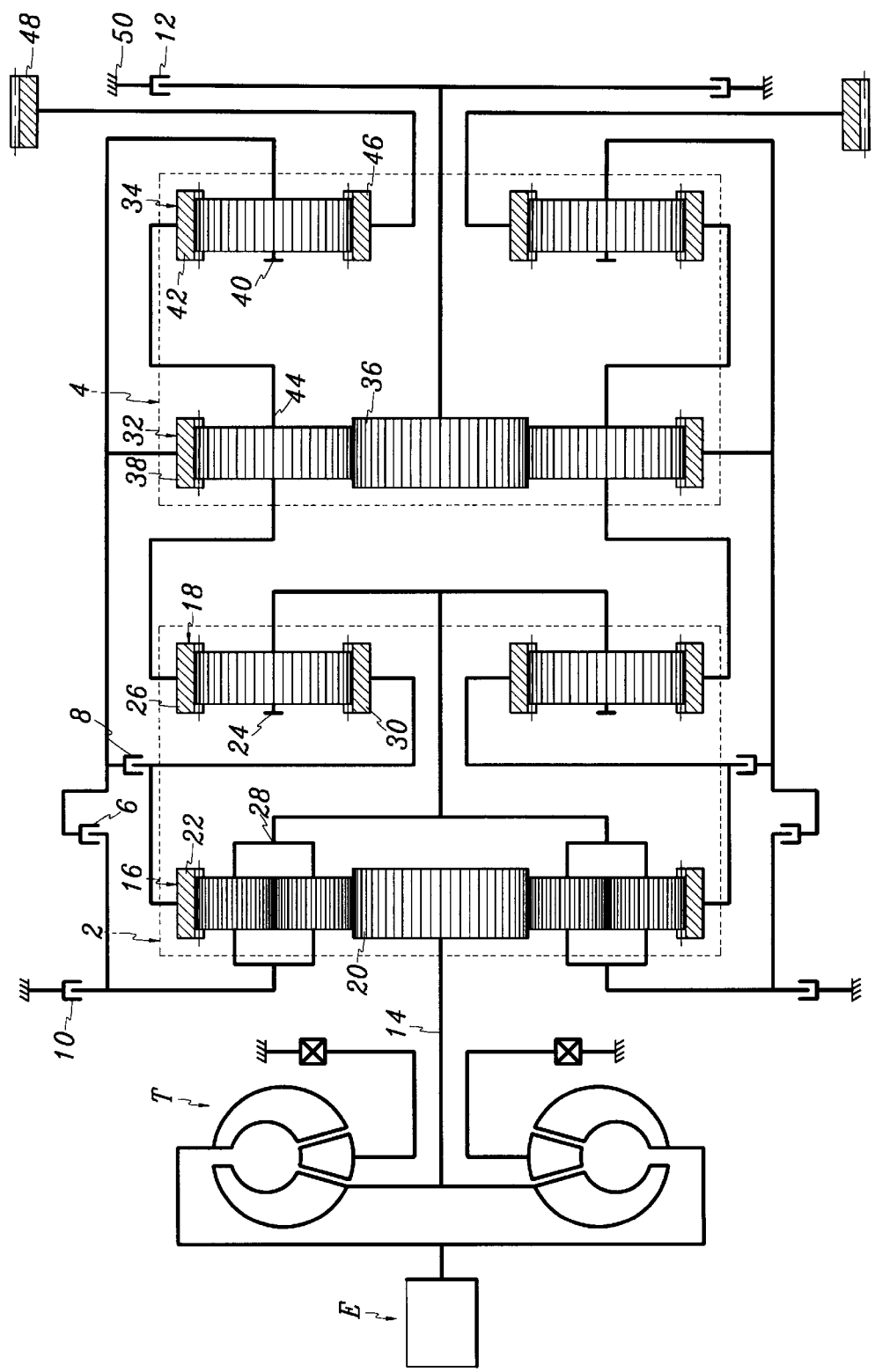
FIG. 18 is a schematic view of a powertrain according to a thirteenth preferred embodiment of the present invention.

Referring to FIG. 18, shown is a schematic view of a powertrain according to a thirteenth preferred embodiment of the present invention. As shown in the drawing, the second compound planetary gearset 4 is realized through the combination of the of the third and fourth simple planetary gearsets 32 and 34, both of which are single pinion planetary gearsets in this embodiment. Namely, the planet carrier 44 and ring gear 38 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the planet carriers 44 and ring gear 42 of the third and fourth simple planetary gearsets 32 and 34 are fixedly connected to the ring gear 26 of the second simple planetary gearset 18, and both the ring gear 38 and planet carrier 40 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 36 of the third simple planetary gearset 32 is connected to the transmission housing 50 with the second brake 12 interposed therebetween such that the sun gear 36 can selectively act as a reacting element. In addition, the sun gear 46 of the fourth simple planetary gearset 34 acts as an output element.

According to the above structure, the operating elements for the second compound planetary gearset 4 in the lever analogies of FIGS. 1–4 are as follows: the first operating element G indicates the sun gear 46 of the fourth simple planetary gearset 34, the second operating element H indicates the ring gear 38 and planet carrier 40 of the third and fourth simple planetary gearset 32 and 34, the third operating element I indicates the planet carrier 44 and ring gear 42 of the third and fourth simple planetary gearsets 32 and 34, and the fourth operating element J indicates the sun gear 36 of the third simple planetary gearset 32.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the thirteenth embodiment, only the structure of the second compound planetary gearset 4 is changed from the first embodiment. As the operation of the operating elements in each shift range is identical to that of the first embodiment, an explanation thereof will be omitted herein.

Fourteenth Embodiment

Figure 19:
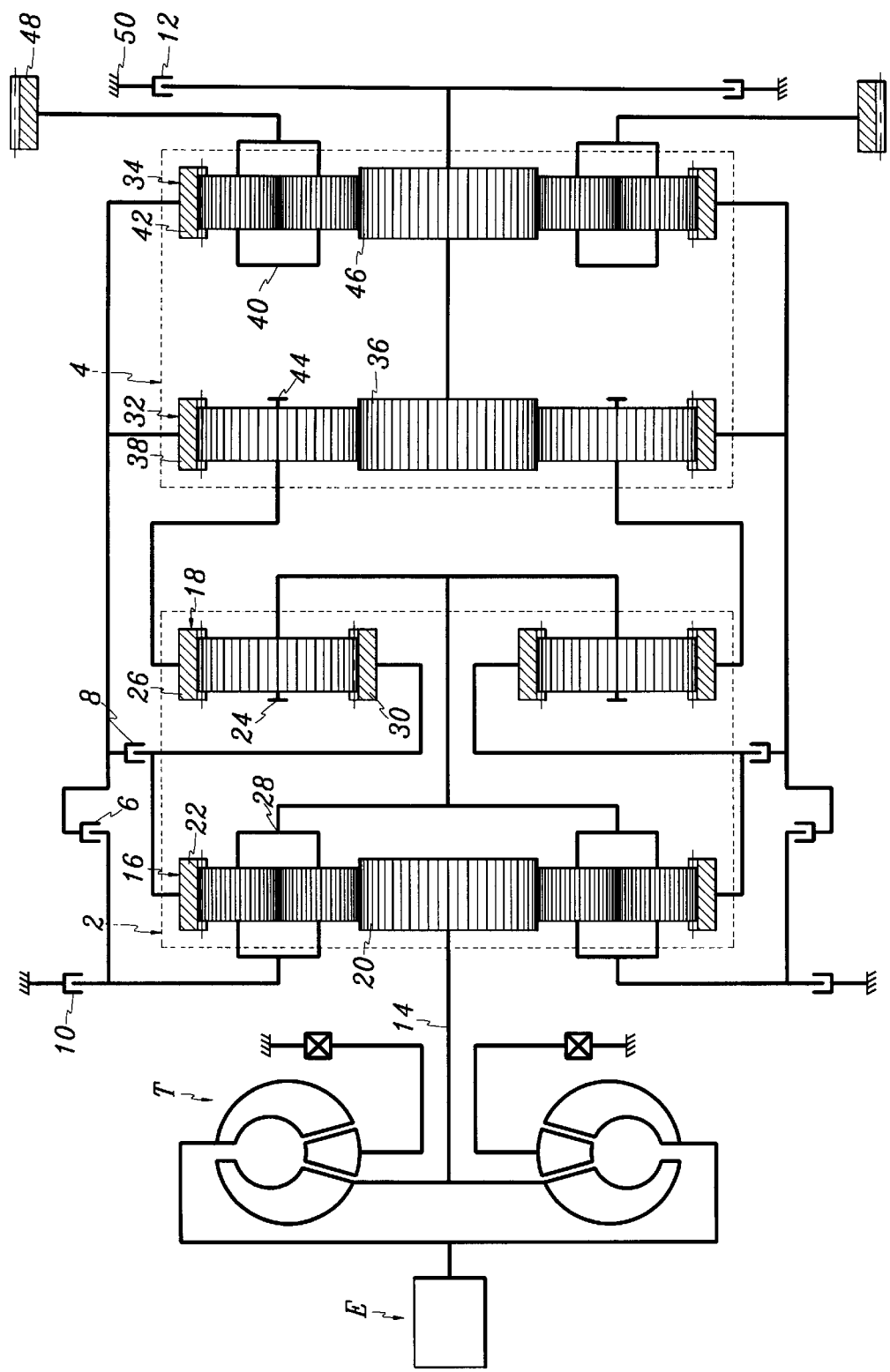
FIG. 19 is a schematic view of a powertrain according to a fourteenth preferred embodiment of the present invention.

Referring to FIG. 19, shown is a schematic view of a powertrain according to a fourteenth preferred embodiment of the present invention. As shown in the drawing, the second compound planetary gearset 4 is realized through the combination of the of the third simple planetary gearset 32, which is a single pinion planetary gearset in this embodiment, with the fourth simple planetary gearset 34, which is a double pinion planetary gearset as in the first embodiment. Namely, the sun gear 36 and ring gear 38 of the third simple planetary gearset 32 are fixedly connected to the sun gear 46 and ring gear 42 of the fourth simple planetary gearset 34, respectively.

Further, with regard to the combination of the first and second compound planetary gearsets 2 and 4, the planet carrier 44 of the third simple planetary gearset 32 is fixedly connected to the ring gear 26 of the second simple planetary gearset 18, and both the ring gears 38 and 42 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gears 36 and 46 of the third and fourth simple planetary gearsets 32 and 34 are connected to the transmission housing 50 with the second brake 12 interposed therebetween such that the sun gears 36 and 46 can selectively act as reacting elements. In addition, the planet carrier 40 of the fourth simple planetary gearset 34 acts as an output element.

According to the above structure, the operating elements for the second compound planetary gearset 4 in the lever analogies of FIGS. 1–4 are as follows: the first operating element G indicates planet carrier 40 of the fourth simple planetary gearset 34, the second operating element H indicates the ring gears 38 and 42 of the third and fourth simple planetary gearsets 32 and 34, the third operating element I indicates the planet carrier 44 of the third simple planetary gearset 32, and the fourth operating element J indicates the sun gears 36 and 46 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fourteenth embodiment, only the structure of the second compound planetary gearset 4 is changed from the first embodiment. As the operation of the operating elements in each shift range is identical to that of the first embodiment, an explanation thereof will be omitted herein.

Fifteenth Embodiment

Figure 20:
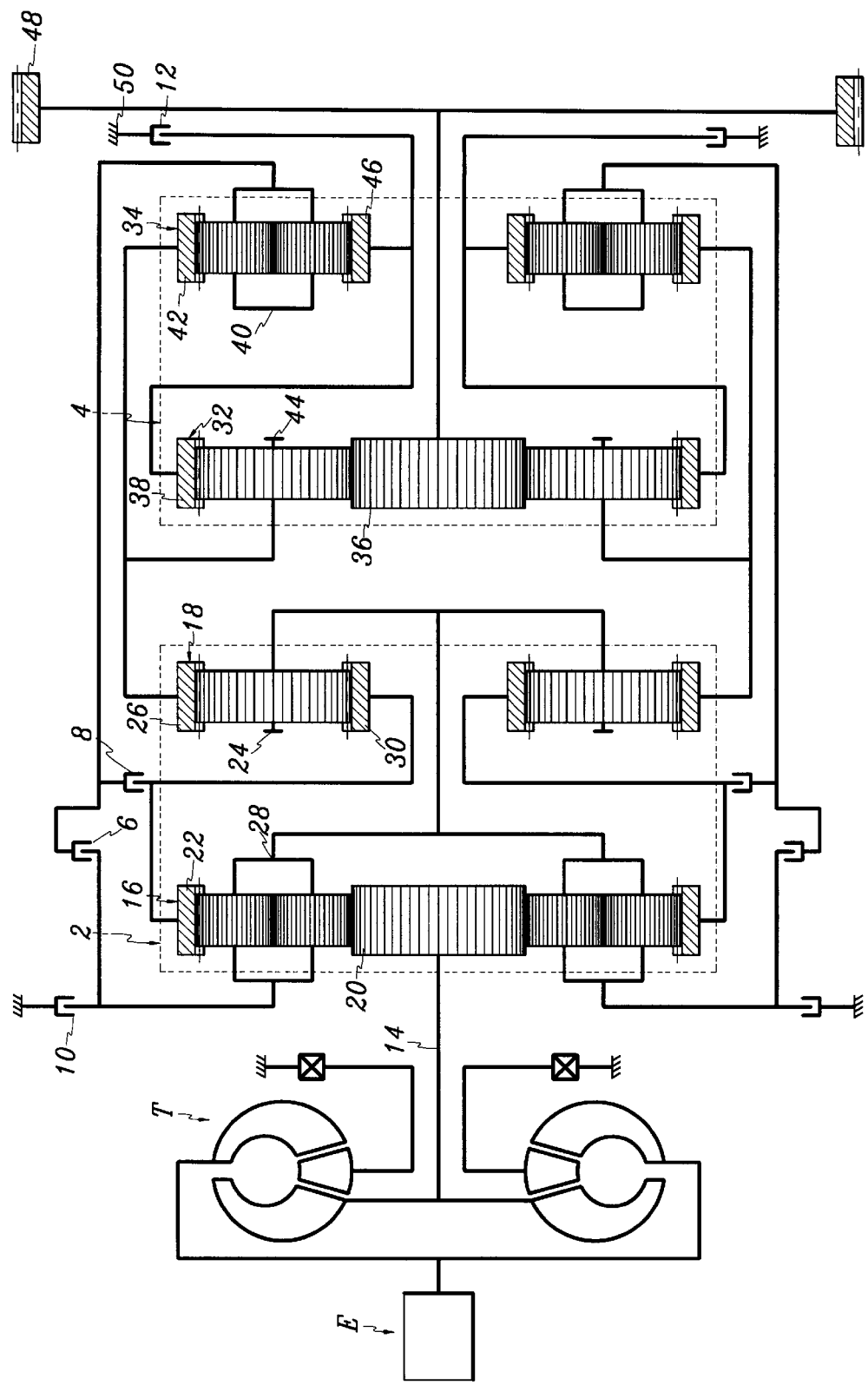
FIG. 20 is a schematic view of a powertrain according to a fifteenth preferred embodiment of the present invention.

Referring to FIG. 20, shown is a schematic view of a powertrain according to a fifteenth preferred embodiment of the present invention. As shown in the drawing, the second compound planetary gearset 4 is realized through the combination of the of the third simple planetary gearset 32, which is a single pinion planetary gearset in this embodiment, with the fourth simple planetary gearset 34, which is a double pinion planetary gearset as in the first embodiment. Namely, the planet carrier 44 and ring gear 38 of the third simple planetary gearset 32 are fixedly connected to the sun gear 46 and ring gear 42 of the fourth simple planetary gearset 34, respectively.

Further, with regard to the combination of the first and second compound planetary gearsets 2 and 4, the planet carrier 44 and ring gear 42 of the third and fourth simple planetary gearsets 32 and 34 are fixedly connected to the ring gear 26 of the second simple planetary gearset 18, and the planet carrier 40 of the fourth simple planetary gearset 34 is variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the ring gear 38 and sun gear 46 of the third and fourth simple planetary gearsets 32 and 34 are connected to the transmission housing 50 with the second brake 12 interposed therebetween such that the ring gear 38 and sun gears 46 can selectively act as reacting elements. In addition, the sun gear 36 of the third simple planetary gearset 32 acts as an output element.

According to the above structure, the operating elements for the second compound planetary gearset 4 in the lever analogies of FIGS. 1–4 are as follows: the first operating element G indicates sun gear 36 of the third simple planetary gearset 32, the second operating element H indicates the planet carrier 40 of the fourth simple planetary gearset 34, the third operating element I indicates the planet carrier 44 and ring gear 42 of the third and fourth simple planetary gearsets 32 and 34, and the fourth operating element J indicates the ring gear 38 and sun gear 46 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fifteenth embodiment, only the structure of the second compound planetary gearset 4 is changed from the first embodiment. As the operation of the operating elements in each shift range is identical to that of the first embodiment, an explanation thereof will be omitted herein.

Sixteenth Embodiment

Figure 21:
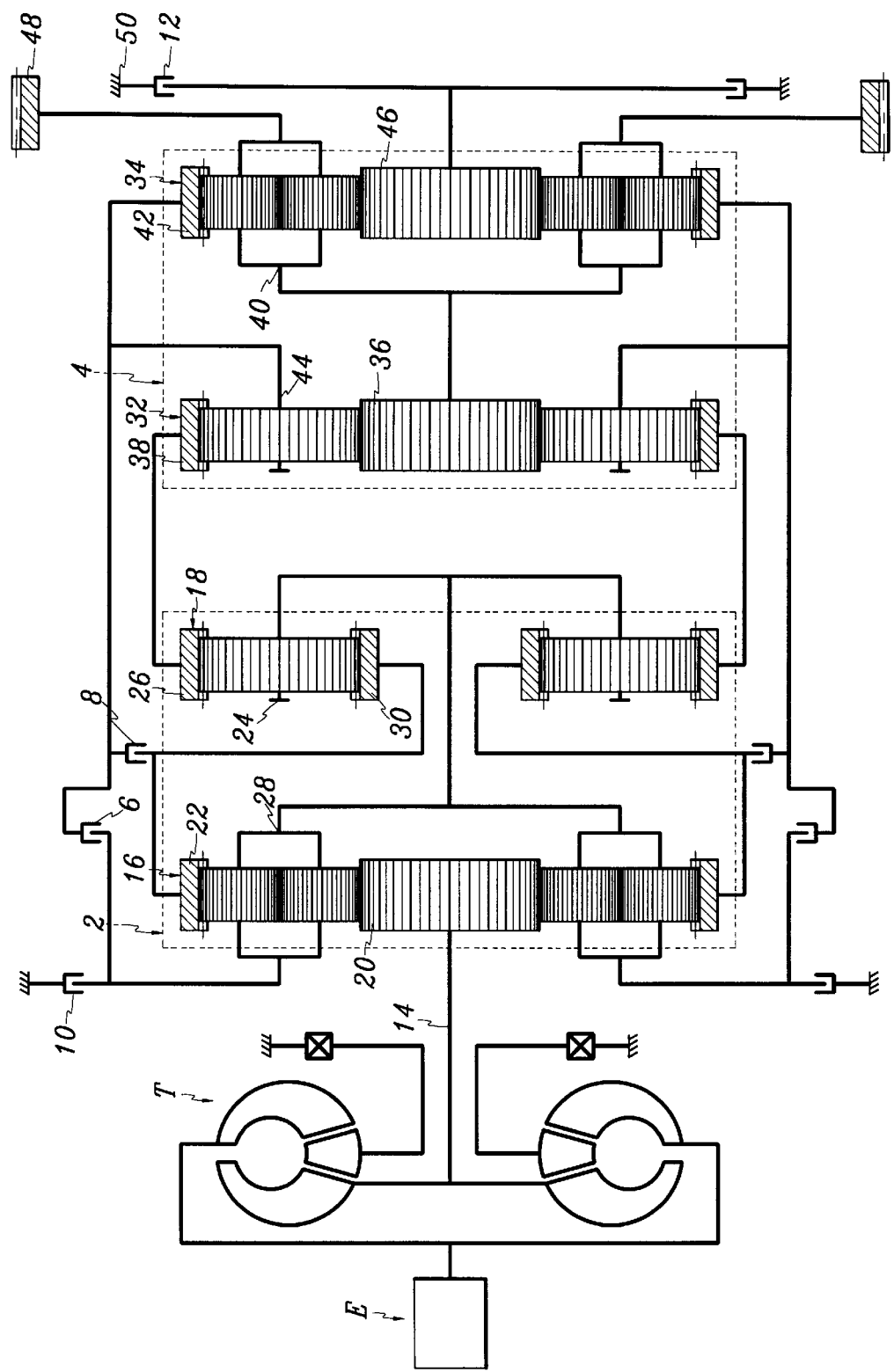
FIG. 21 is a schematic view of a powertrain according to a sixteenth preferred embodiment of the present invention.

Referring to FIG. 21, shown is a schematic view of a powertrain according to a sixteenth preferred embodiment of the present invention. As shown in the drawing, the second compound planetary gearset 4 is realized through the combination of the of the third simple planetary gearset 32, which is a single pinion planetary gearset as in this embodiment, with the fourth simple planetary gearset 34, which is a double pinion planetary gearset as in the first embodiment. Namely, the planet carrier 44 and sun gear 36 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the ring gear 38 of the third simple planetary gearset 32 is fixedly connected to the ring gear 26 of the second simple planetary gearset 18, and both the planet carrier 44 and ring gear 42 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gear 36 and planet carrier 40 of the third and fourth simple planetary gearsets 32 and 34 act as output elements.

According to the above structure, the operating elements for the second compound planetary gearset 4 in the lever analogies of FIGS. 1–4 are as follows: the first operating element G indicates sun gear 36 and planet carrier 40 of the third and fourth simple planetary gearsets 32 and 34, the second operating element H indicates the planet carrier 44 and ring gear 42 of the third and fourth simple planetary gearsets 32 and 34, the third operating element I indicates the ring gear 38 of the third simple planetary gearset 32, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the sixteenth embodiment, only the structure of the second compound planetary gearset 4 is changed from the first embodiment. As the operation of the operating elements in each shift range is identical to that of the first embodiment, an explanation thereof will be omitted herein.

Seventeenth Embodiment

Figure 22:
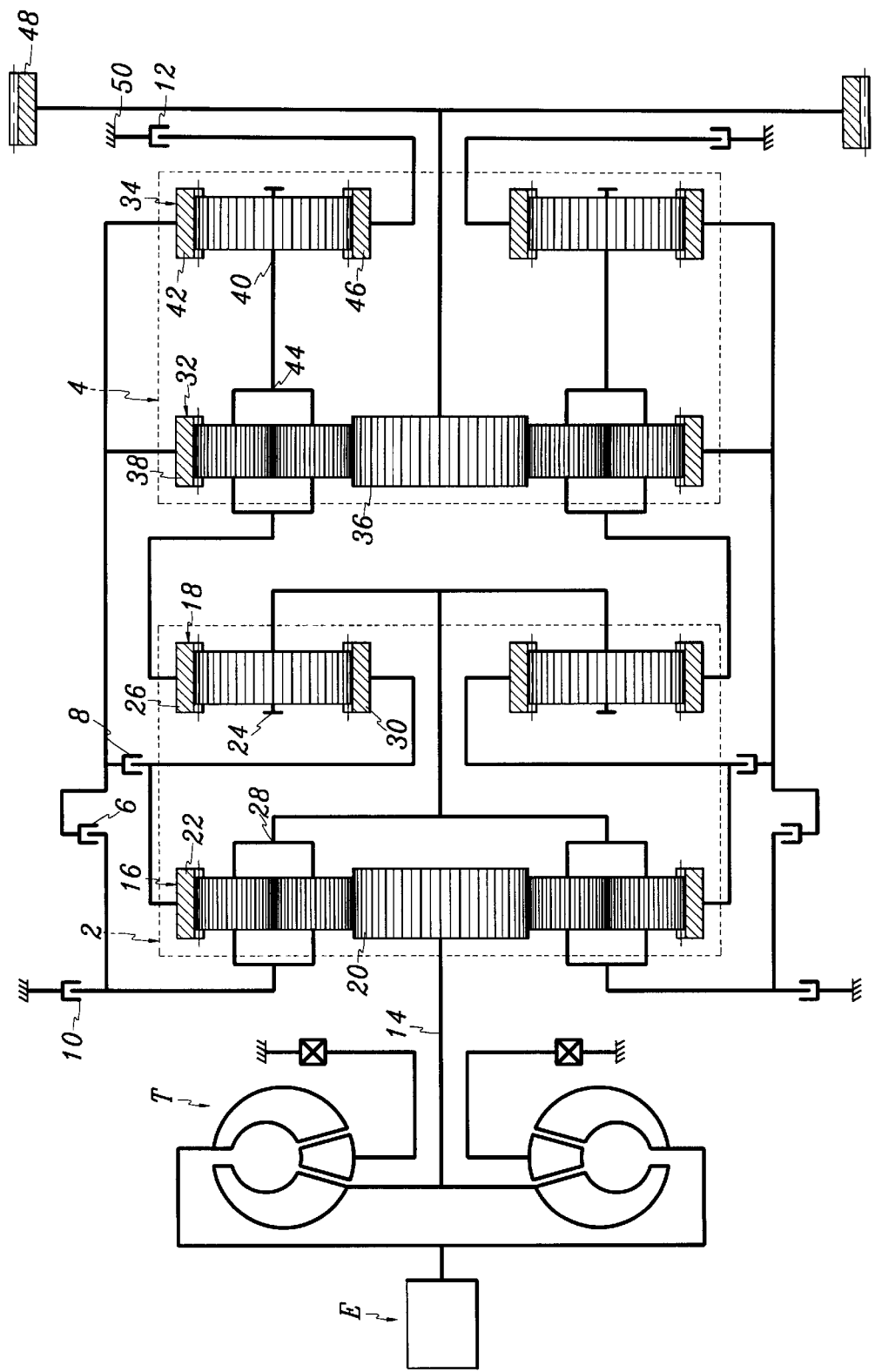
FIG. 22 is a schematic view of a powertrain according to a seventeenth preferred embodiment of the present invention.

Referring to FIG. 22, shown is a schematic view of a powertrain according to a seventeenth preferred embodiment of the present invention. As shown in the drawing, the second compound planetary gearset 4 is realized through the combination of the of the third simple planetary gearset 32, which is a double pinion planetary gearset as in the first embodiment, with the fourth simple planetary gearset 34, which is a single pinion planetary gearset in this embodiment. Namely, the planet carrier 44 and ring gear 38 of the third simple planetary gearset 32 are fixedly connected to the planet carrier 40 and ring gear 42 of the fourth simple planetary gearset 34, respectively.

Further, with regard to the combination of the first and second compound planetary gearsets 2 and 4, the planet carriers 44 and 40 of the third and fourth simple planetary gearsets 32 and 34 are fixedly connected to the ring gear 26 of the second simple planetary gearset 18, and both the ring gears 38 and 42 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 46 of the fourth simple planetary gearset 32 is connected to the transmission housing 50 with the second brake 12 interposed therebetween such that the sun gear 46 can selectively act as a reacting element. In addition, the sun gear 36 of the third simple planetary gearset 32 acts as an output element.

According to the above structure, the operating elements for the second compound planetary gearset 4 in the lever analogies of FIGS. 1–4 are as follows: the first operating element G indicates sun gear 36 of the third simple planetary gearset 32, the second operating element H indicates the ring gears 38 and 42 of the third and fourth simple planetary gearsets 32 and 34, the third operating element I indicates the planet carriers 44 and 40 of the third and fourth simple planetary gearsets 32 and 34, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the seventeenth embodiment, only the structure of the second compound planetary gearset 4 is changed from the first embodiment. As the operation of the operating elements in each shift range is identical to that of the first embodiment, an explanation thereof will be omitted herein.

Eighteenth Embodiment

Figure 23:
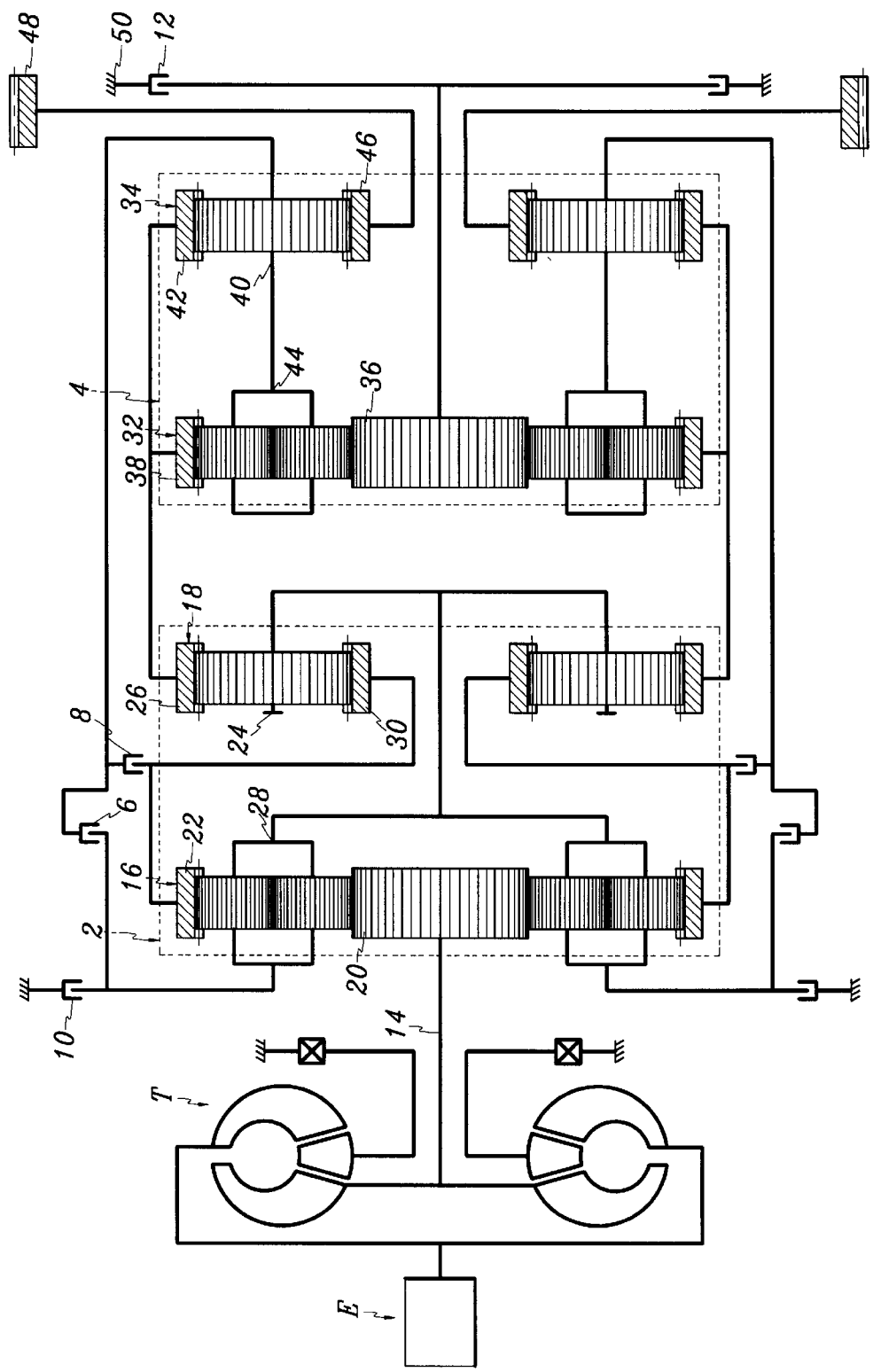
FIG. 23 is a schematic view of a powertrain according to an eighteenth preferred embodiment of the present invention.

Referring to FIG. 23, shown is a schematic view of a powertrain according to an eighteenth preferred embodiment of the present invention. As shown in the drawing, the second compound planetary gearset 4 is realized through the combination of the of the third simple planetary gearset 32, which is a double pinion planetary gearset as in the first embodiment, with the fourth simple planetary gearset 34, which is a single pinion planetary gearset in this embodiment. Namely, the planet carrier 44 and ring gear 38 of the third simple planetary gearset 32 are fixedly connected to the planet carrier 40 and ring gear 42 of the fourth simple planetary gearset 34, respectively.

Further, with regard to the combination of the first and second compound planetary gearsets 2 and 4, the ring gears 38 and 42 of the third and fourth simple planetary gearsets 32 and 34 are fixedly connected to the ring gear 26 of the second simple planetary gearset 18, and both the planet carriers 44 and 40 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 36 of the third simple planetary gearset 32 is connected to the transmission housing 50 with the second brake 12 interposed therebetween such that the sun gear 36 can selectively act as a reacting element. In addition, the sun gear 46 of the fourth simple planetary gearset 34 acts as an output element.

According to the above structure, the operating elements for the second compound planetary gearset 4 in the lever analogies of FIGS. 1–4 are as follows: the first operating element G indicates sun gear 46 of the fourth simple planetary gearset 34, the second operating element H indicates the planet carriers 44 and 40 of the third and fourth simple planetary gearsets 32 and 34, the third operating element I indicates the ring gears 38 and 42 the third and fourth simple planetary gearsets 32 and 34, and the fourth operating element J indicates the sun gear 36 of the third simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the eighteenth embodiment, only the structure of the second compound planetary gearset 4 is changed from the first embodiment. As the operation of the operating elements in each shift range is identical to that of the first embodiment, an explanation thereof will be omitted herein.

Nineteenth Embodiment

Figure 24:
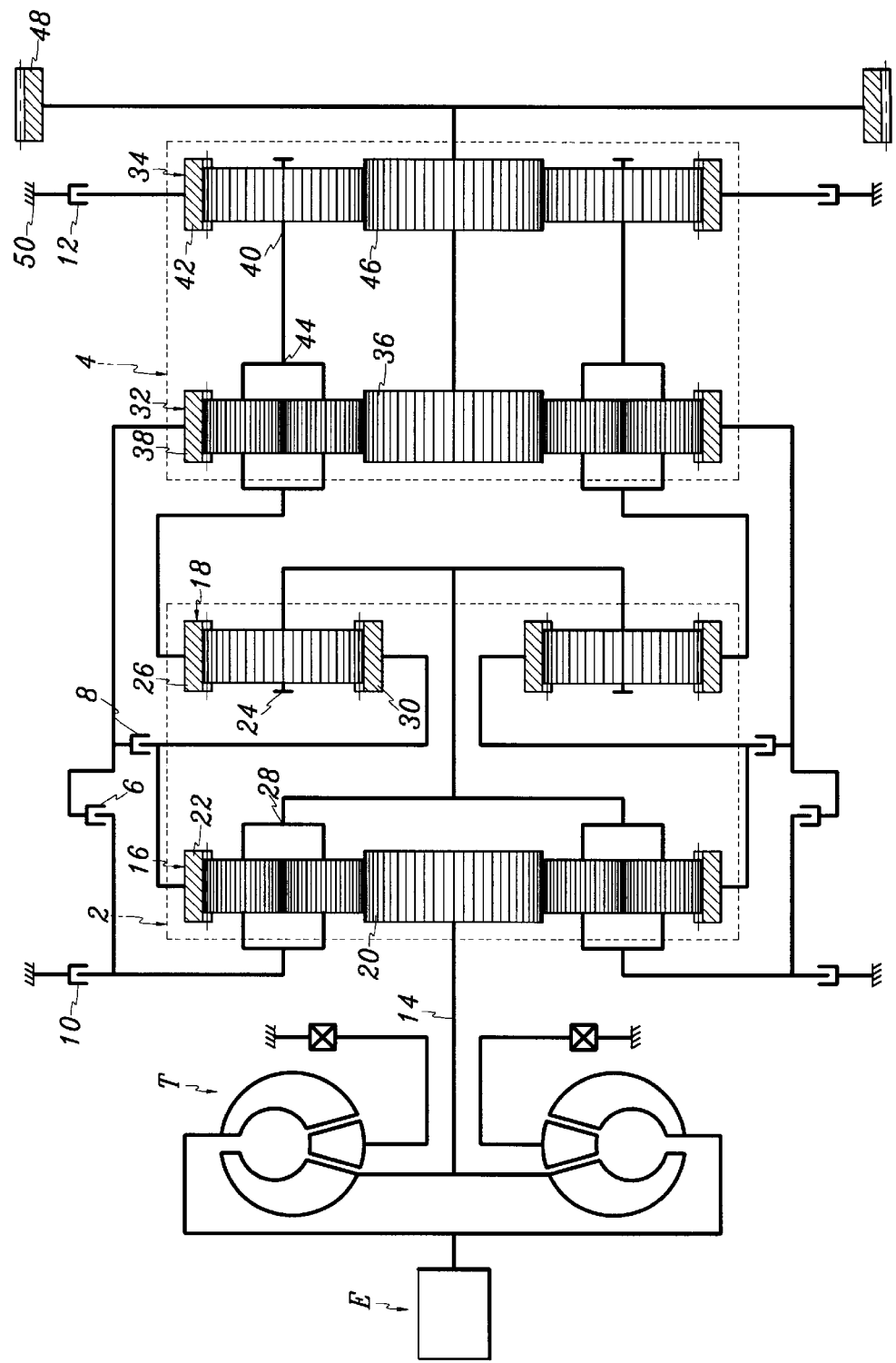
FIG. 24 is a schematic view of a powertrain according to a nineteenth preferred embodiment of the present invention.

Referring to FIG. 24, shown is a schematic view of a powertrain according to a nineteenth preferred embodiment of the present invention. As shown in the drawing, the second compound planetary gearset 4 is realized through the combination of the of the third simple planetary gearset 32, which is a double pinion planetary gearset as in the first embodiment, with the fourth simple planetary gearset 34, which is a single pinion planetary gearset in this embodiment. Namely, the sun gear 36 and planet carrier 44 of the third simple planetary gearset 32 are fixedly connected to the sun gear 46 and planet carrier 40 of the fourth simple planetary gearset 34, respectively.

Further, with regard to the combination of the first and second compound planetary gearsets 2 and 4, the planet carriers 44 and 40 of the third and fourth simple planetary gearsets 32 and 34 are fixedly connected to the ring gear 26 of the second simple planetary gearset 18, and the ring gear 38 of the third simple planetary gearset 32 is variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the ring gear 42 of the fourth simple planetary gearset 34 is connected to the transmission housing 50 with the second brake 12 interposed therebetween such that the ring gear 42 can selectively act as a reacting element. In addition, the sun gears 36 and 46 of the third and fourth simple planetary gearsets 32 and 34 act as output elements.

According to the above structure, the operating elements for the second compound planetary gearset 4 in the lever analogies of FIGS. 1–4 are as follows: the first operating element G indicates the sun gears 36 and 46 of the third and fourth simple planetary gearsets 32 and 34, the second operating element H indicates the ring gear 38 of the third simple planetary gearset 32, the third operating element I indicates the planet carriers 44 and 40 of the third and fourth simple planetary gearsets 32 and 34, and the fourth operating element J indicates the ring gear 42 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the nineteenth embodiment, only the structure of the second compound planetary gearset 4 is changed from the first embodiment. As the operation of the operating elements in each shift range is identical to that of the first embodiment, an explanation thereof will be omitted herein.

Twentieth Embodiment

Figure 25:
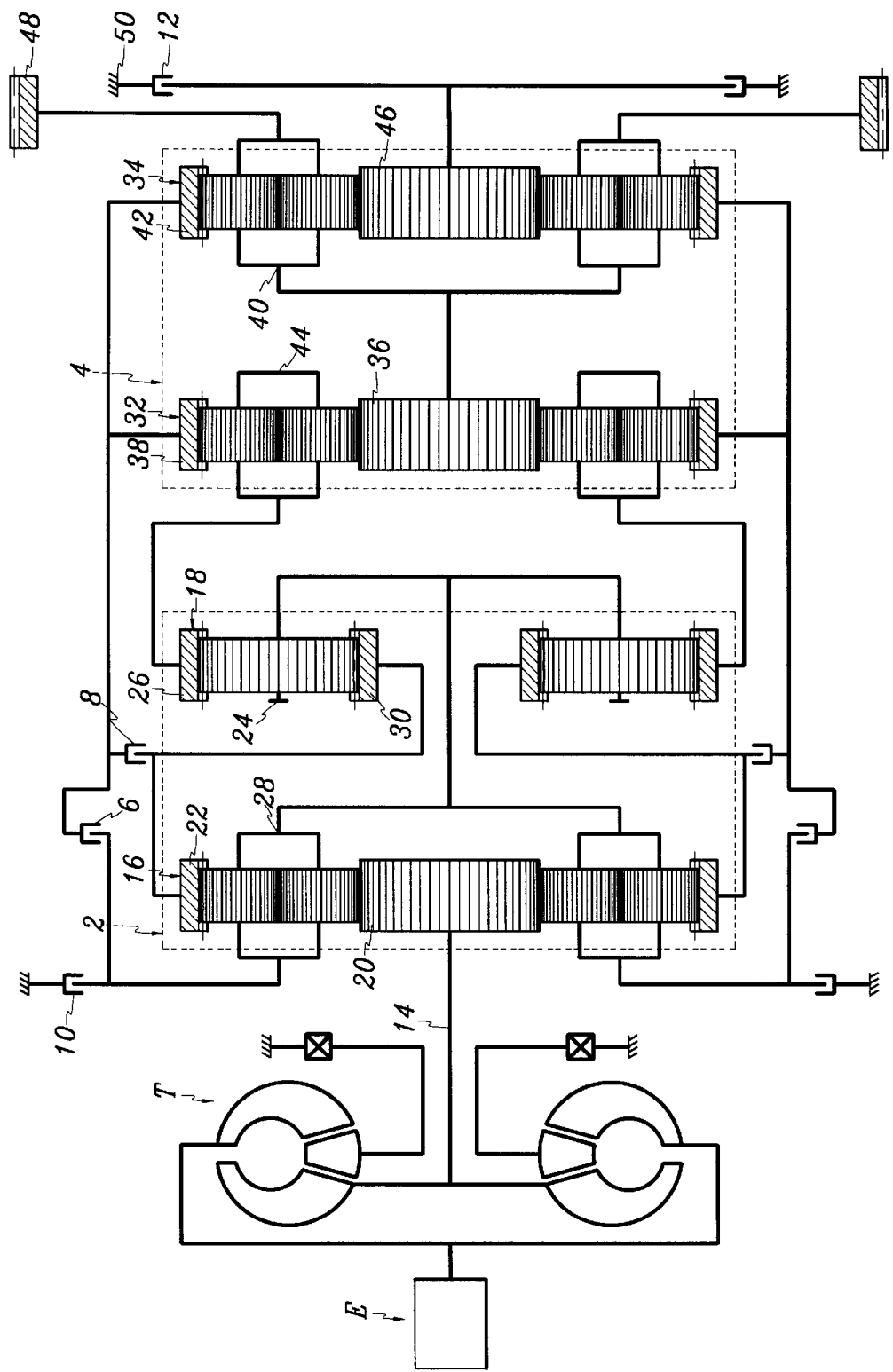
FIG. 25 is a schematic view of a powertrain according to a twentieth preferred embodiment of the present invention.

Referring to FIG. 25, shown is a schematic view of a powertrain according to a twentieth preferred embodiment of the present invention. As shown in the drawing, the second compound planetary gearset 4 is realized through the combination of the of the third and fourth simple planetary gearsets 32 and 34, both of which are double pinion planetary gearsets as in the first embodiment. Namely, the sun gear 36 and ring gear 38 of the third simple planetary gearset 32 are fixedly connected to the planet carrier 40 and ring gear 42 of the fourth simple planetary gearset 34, respectively.

Further, with regard to the combination of the first and second compound planetary gearsets 2 and 4, the planet carrier 44 of the third simple planetary gearset 32 is fixedly connected to the ring gear 26 of the second simple planetary gearset 18, and both the ring gears 38 and 42 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gears 36 and planet carrier 40 of the third and fourth simple planetary gearsets 32 and 34 act as output elements.

According to the above structure, the operating elements for the second compound planetary gearset 4 in the lever analogies of FIGS. 1–4 are as follows: the first operating element G indicates the sun gear 36 and planet carrier 40 of the third and fourth simple planetary gearsets 32 and 34, the second operating element H indicates the ring gears 38 and 42 of the third and fourth simple planetary gearsets 32 and 34, the third operating element I indicates the planet carrier 44 of the third simple planetary gearset 32, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the twentieth embodiment, only the structure of the second compound planetary gearset 4 is changed from the first embodiment. As the operation of the operating elements in each shift range is identical to that of the first embodiment, an explanation thereof will be omitted herein.

Twenty-first Embodiment

Figure 26:
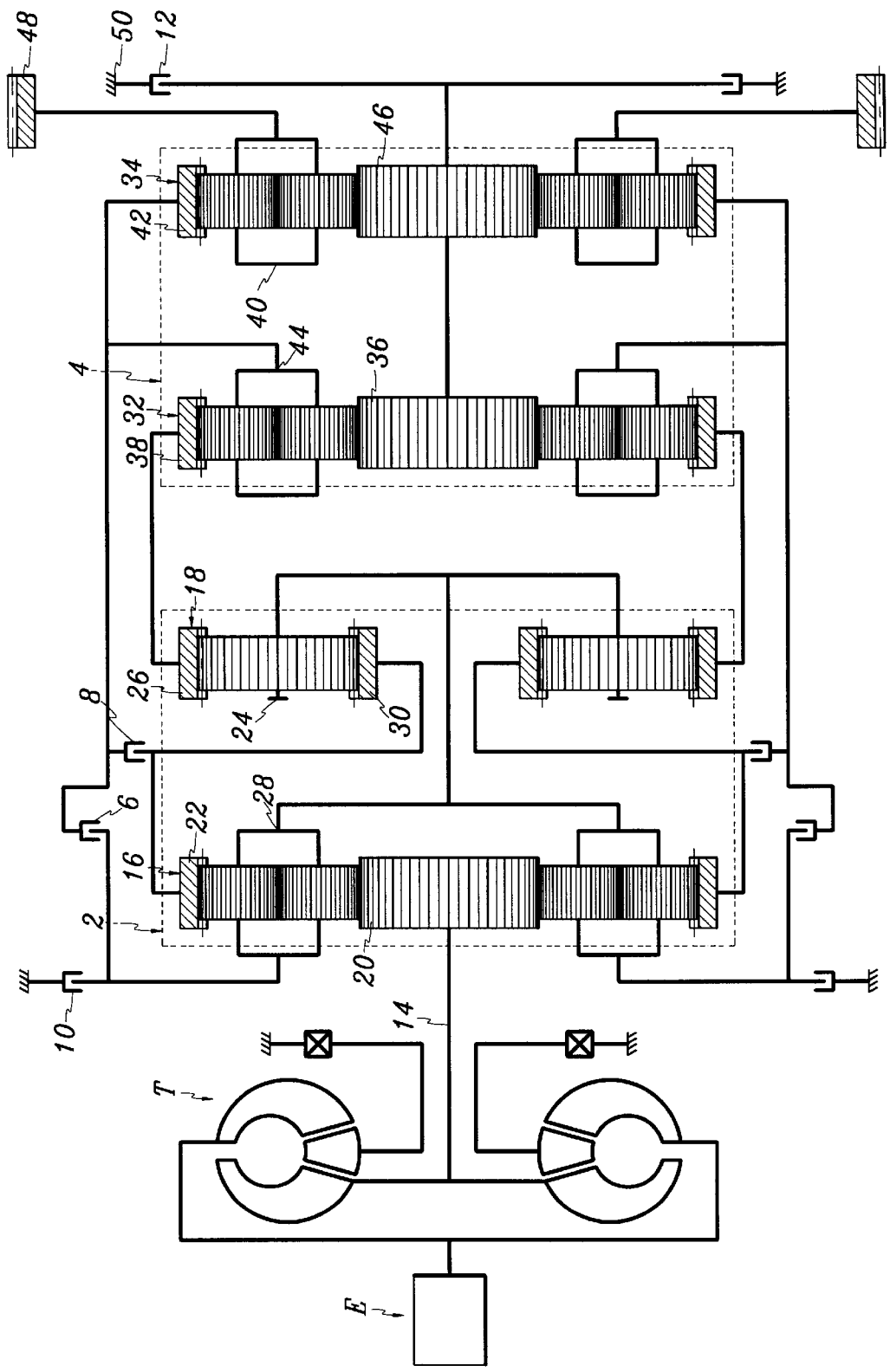
FIG. 26 is a schematic view of a powertrain according to a twenty-first preferred embodiment of the present invention.

Referring to FIG. 26, shown is a schematic view of a powertrain according to a twenty-first preferred embodiment of the present invention. As shown in the drawing, the second compound planetary gearset 4 is realized through the combination of the of the third and fourth simple planetary gearsets 32 and 34, both of which are double pinion planetary gearsets as in the first embodiment. Namely, the sun gear 36 and planet carrier 44 of the third simple planetary gearset 32 are fixedly connected to the sun gear 46 and ring gear 42 of the fourth simple planetary gearset 34, respectively.

Further, with regard to the combination of the first and second compound planetary gearsets 2 and 4, the ring gear 38 of the third simple planetary gearset 32 is fixedly connected to the ring gear 26 of the second simple planetary gearset 18, and both the planet carrier 44 and ring gear 42 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gears 36 and 46 of the third and fourth simple planetary gearsets 32 and 34 are connected to the transmission housing 50 with the second brake 12 interposed therebetween such that the sun gears 36 and 46 can selectively act as reacting elements. In addition, the planet carrier 40 of the fourth simple planetary gearset 34 acts as an output element.

According to the above structure, the operating elements for the second compound planetary gearset 4 in the lever analogies of FIGS. 1–4 are as follows: the first operating element G indicates the planet carrier 40 of the fourth simple planetary gearset 34, the second operating element H indicates the planet carrier 44 and ring gear 42 of the third and fourth simple planetary gearsets 32 and 34, the third operating element I indicates the ring gear 38 of the third simple planetary gearset 32, and the fourth operating element J indicates the sun gears 36 and 46 of the third and fourth simple planetary gearsets 32 and 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the twenty-first embodiment, only the structure of the second compound planetary gearset 4 is changed from the first embodiment. As the operation of the operating elements in each shift range is identical to that of the first embodiment, an explanation thereof will be omitted herein.

Twenty-second Embodiment

Figure 27:
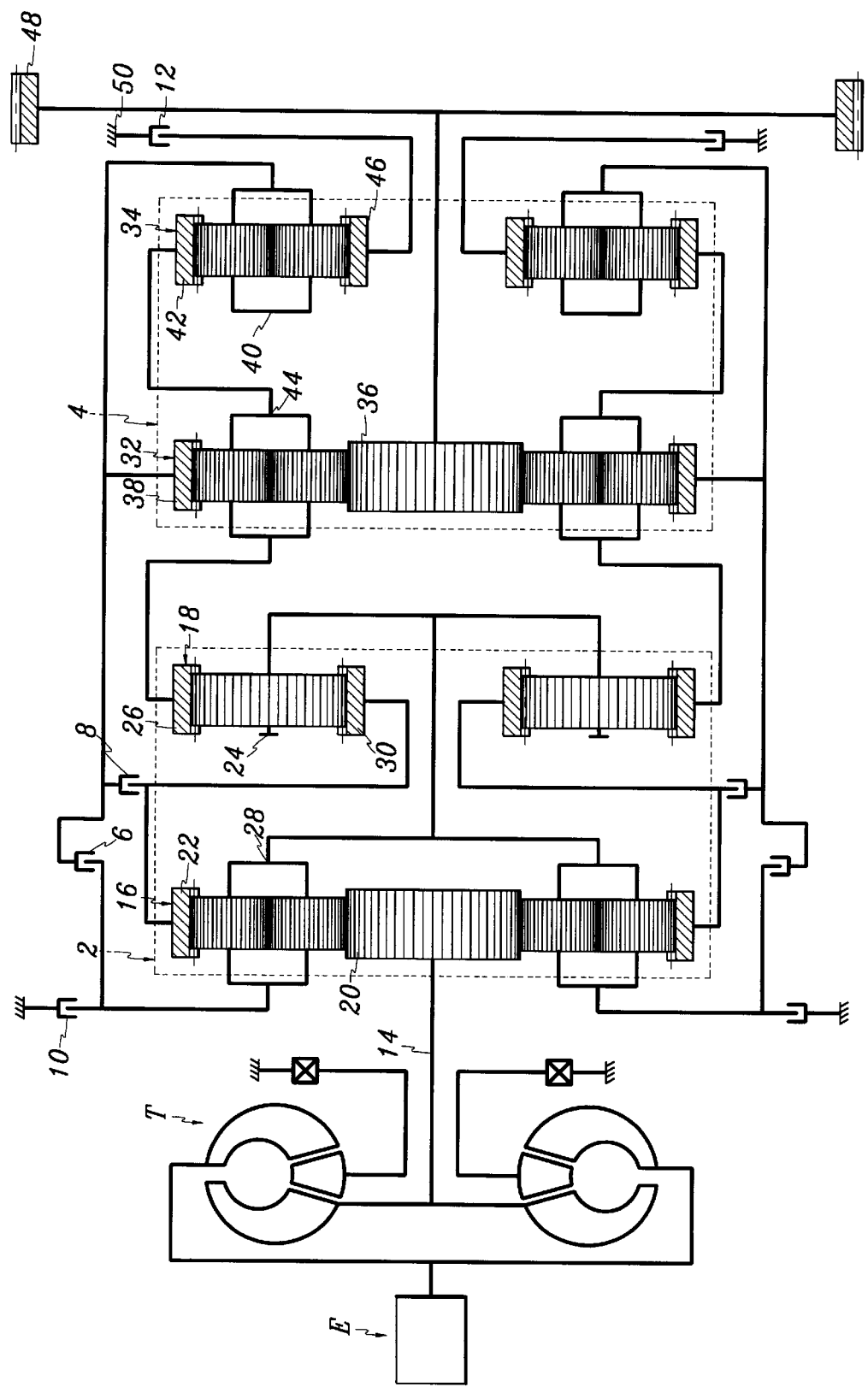
FIG. 27 is a schematic view of a powertrain according to a twenty-second preferred embodiment of the present invention.

Referring to FIG. 27, shown is a schematic view of a powertrain according to a twenty-second preferred embodiment of the present invention. As shown in the drawing, the second compound planetary gearset 4 is realized through the combination of the of the third and fourth simple planetary gearsets 32 and 34, both of which are double pinion planetary gearsets as in the first embodiment. Namely, the planet carrier 44 and ring gear 38 of the third simple planetary gearset 32 are fixedly connected to the ring gear 42 and planet carrier 40 of the fourth simple planetary gearset 34, respectively.

Further, with regard to the combination of the first and second compound planetary gearsets 2 and 4, the planet carrier 44 and ring gear 42 of the third and fourth simple planetary gearsets 32 and 34 are fixedly connected to the ring gear 26 of the second simple planetary gearset 18, and both the ring gear 38 and planet carrier 40 of the third and fourth simple planetary gearsets 32 and 34 are variably connected to both the planet carriers 28 and 24 of the first and second simple planetary gearsets 16 and 18 through the first clutch 6, and to both the ring gear 22 and sun gear 30 of the first and second simple planetary gearsets 16 and 18 through the second clutch 8.

Also, the sun gear 46 of the fourth simple planetary gearset 34 is connected to the transmission housing 50 with the second brake 12 interposed therebetween such that the sun gear 46 can selectively act as a reacting element. In addition, the sun gear 36 of the third simple planetary gearset 32 acts as an output element.

According to the above structure, the operating elements for the second compound planetary gearset 4 in the lever analogies of FIGS. 1–4 are as follows: the first operating element G indicates the sun gear 36 of the third simple planetary gearset 32, the second operating element H indicates the ring gear 38 and planet carrier 40 of the third and fourth simple planetary gearsets 32 and 34, the third operating element I indicates the planet carrier 44 and ring gear 42 of the third and fourth simple planetary gearsets 32 and 34, and the fourth operating element J indicates the sun gear 46 of the fourth simple planetary gearset 34.

The operating elements of the first compound planetary gearset 2 are connected to the operating elements of the second compound planetary gearset 4 identically as in the first embodiment. Namely, the third operating element I of the second compound planetary gearset 4 is fixedly connected to the fourth operating element D of the first compound planetary gearset 2, and the second operating element H of the second compound planetary gearset 4 is variably connected to the second and third operating elements B and C of the first compound planetary gearset 2.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the twenty-second embodiment, only the structure of the second compound planetary gearset 4 is changed from the first embodiment. As the operation of the operating elements in each shift range is identical to that of the first embodiment, an explanation thereof will be omitted herein.

In the powertrain for a 5-speed automatic transmission structured and operating as in the above, by eliminating an element rotating faster than a final output element needed in the prior art when in overdrive, power loss is minimized. Also, as the number of friction elements is reduced, the powertrain can be designed to be lightweight and compact in size.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A powertrain for a 5-speed automatic transmission comprising:
   a first compound planetary gearset comprising first and second simple planetary gearsets having first, second, third, and fourth operating elements, one of said operating elements acting as an input element;
   a second compound planetary gearset comprising third and fourth simple planetary gearsets having fifth, sixth, seventh, and eighth operating elements, one of said fifth to eighth operating elements being fixedly connected to one of said first to fourth operating elements, one of said fifth to eighth operating elements being variably connected to two of said first to fourth operating elements, and one of said fifth to eighth operating elements operating as an output element;

clutch means for variably connecting said operating elements of the first and second compound planetary gearsets; and brake means for selectively connecting at least one of the operating elements of the first and second compound planetary gearsets to a transmission housing.

2. The powertrain of claim 1, wherein said first compound planetary gearset is realized through a combination of the first and second simple planetary gearsets, and said second compound planetary gearset is realized through a combination of the third and fourth simple planetary gearsets, said first, second, third, and fourth simple planetary gearsets being double pinion planetary gearsets.

3. The powertrain of claim 2, wherein a sun gear and a ring gear of the first simple planetary gearset are fixedly connected respectively to a planet carrier and a ring gear of the second simple planetary gearset.

4. The powertrain of claim 2, wherein a sun gear and a ring gear of the third simple planetary gearset are fixedly connected respectively to a planet carrier and a ring gear of the fourth simple planetary gearset.

5. The powertrain of claim 2, wherein a sun gear of the second simple planetary gearset is fixedly connected to a planet carrier of the third simple planetary gearset, and ring gears of the third and fourth simple planetary gearsets are variably connected to both a planet carrier of the first simple planetary gearset, and to ring gears of the first and second simple planetary gearsets.

6. The powertrain of claim 3, wherein a sun gear of the second simple planetary gearset is fixedly connected to a planet carrier of the third simple planetary gearset, and ring gears of the third and fourth simple planetary gearsets are variably connected to both a planet carrier of the first simple planetary gearset, and to ring gears of the first and second simple planetary gearsets.

7. The powertrain of claim 4, wherein a sun gear of the second simple planetary gearset is fixedly connected to a planet carrier of the third simple planetary gearset, and the ring gears of the third and fourth simple planetary gearsets are variably connected to both a planet carrier of the first simple planetary gearset, and to ring gears of the first and second simple planetary gearsets.

8. The powertrain of claim 2, wherein a sun gear and a planet carrier of the third simple planetary gearset are fixedly connected respectively to a sun gear and a ring gear of the second simple planetary gearset.

9. The powertrain of claim 2, wherein a sun gear of the second simple planetary gearset is fixedly connected to a ring gear of the third simple planetary gearset, and both a planet carrier of the third and a ring gear of the fourth simple planetary gearsets are variably connected to a planet carrier of the first simple planetary gearset, and to ring gears of the first and second simple planetary gearset.

10. The powertrain of claim 4, wherein a sun gear of the second simple planetary gearset is fixedly connected to the ring gear of the third simple planetary gearset, and both a planet carrier of the third and the ring gear of the fourth simple planetary gearsets are variably connected to a planet carrier of the first simple planetary gearset, and to ring gears of the first and second simple planetary gearset.

11. The powertrain of claim 6, wherein the sun gear of the second simple planetary gearset is fixedly connected to a ring gear of the third simple planetary gearset, and both the planet carrier of the third and a ring gear of the fourth simple planetary gearsets are variably connected to a planet carrier of the first simple planetary gearset, and to ring gears of the first and second simple planetary gearset.

12. The powertrain of claim 2, wherein a planet carrier and a ring gear of the third simple planetary gearset are fixedly connected respectively to a ring gear and a planet carrier of the second simple planetary gearset.

13. The powertrain of claim 2, wherein a sun gear of the second simple planetary gearset is fixedly connected to a planet carrier and a ring gear of the third and fourth simple planetary gearsets, and both a ring gear of the third and a planet carrier of the fourth simple planetary gearsets are variably connected to a planet carrier of the first simple planetary gearset, and to ring gears of the first and second simple planetary gearset.

14. The powertrain of claim 4, wherein a sun gear of the second simple planetary gearset is fixedly connected to a planet carrier of the third and the ring gear of the fourth simple planetary gearsets, and both the ring gear and planet carrier of the third and fourth simple planetary gearsets are variably connected to a planet carrier of the first simple planetary gearset, and to ring gears of the first and second simple planetary gearset.

15. The powertrain of claim 8, wherein a sun gear of the second simple planetary gearset is fixedly connected to the planet carrier and a ring gear of the third and fourth simple planetary gearsets, and both the ring gear of the third and a planet carrier of the fourth simple planetary gearsets are variably connected to a planet carrier of the first simple planetary gearset, and to ring gears of the first and second simple planetary gearset.

16. The powertrain of claim 1, wherein the first compound planetary gearset is realized through a combination of the first and second simple planetary gearset, both of which are double pinion planetary gearsets, and the second compound planetary gearset is realized through a combination of the third simple planetary gearset, which is a double pinion planetary gearset, with the fourth simple planetary gearset, which is a single pinion planetary gearset.

17. The powertrain of claim 10, wherein a sun gear and a ring gear of the first simple planetary gearset are fixedly connected respectively to a planet carrier and a ring gear of the second simple planetary gearset.

18. The powertrain of claim 10, wherein a planet carrier and a ring gear of the third simple planetary gearset are fixedly connected respectively to a planet carrier and a ring gear of the fourth simple planetary gearset.

19. The powertrain of claim 10, wherein a sun gear of the second simple planetary gearset is fixedly connected to ring gears of the third and fourth simple planetary gearsets, and planet carriers of the third and fourth simple planetary gearsets are variably connected to a planet carrier of the first simple planetary gearset, and to ring gears of the first and second simple planetary gearset.

20. The powertrain of claim 11, wherein a sun gear of the second simple planetary gearset is fixedly connected to ring gears of the third and fourth simple planetary gearsets, and planet carriers of the third and fourth simple planetary gearsets are variably connected to a planet carrier of the first simple planetary gearset, and to the ring gears of the first and second simple planetary gearset.

21. The powertrain of claim 12, wherein a sun gear of the second simple planetary gearset is fixedly connected to the ring gears of the third and fourth simple planetary gearsets, and the planet carriers of the third and fourth simple planetary gearsets are variably connected to a planet carrier of the first simple planetary gearset, and to ring gears of the first and second simple planetary gearset.

22. The powertrain of claim 10, wherein a planet carrier and a ring gear of the third simple planetary gearset are fixedly connected respectively to a planet carrier and a ring gear of the second simple planetary gearset.

23. The powertrain of claim 10, wherein sun gears of the first and second simple planetary gearsets are fixedly connected to a planet carrier of the third simple planetary gearset, and ring gears of the third and fourth simple planetary gearsets are variably connected to a planet carrier of the first simple planetary gearset, and to ring gears of the first and second simple planetary gearset.

24. The powertrain of claim 11, wherein sun gears of the first and second simple planetary gearsets are fixedly connected to the planet carrier of the third simple planetary gearset, and ring gears of the third and fourth simple planetary gearsets are variably connected to a planet carrier of the first simple planetary gearset, and to the ring gears of the first and second simple planetary gearset.

25. The powertrain of claim 10, wherein a sun gear and a planet carrier of the third simple planetary gearset are fixedly connected respectively to a sun gear and a planet carrier of the second simple planetary gearset.

26. The powertrain of claim 10, wherein a sun gear of the second simple planetary gearset is fixedly connected to planet carriers of the third and fourth simple planetary gearsets, and ring gears of the third and fourth simple planetary gearsets are variably connected to both a planet carrier of the first simple planetary gearset, and to ring gears of the first and second simple planetary gearsets.

27. The powertrain of claim 11, wherein a sun gear of the second simple planetary gearset is fixedly connected to planet carriers of the third and fourth simple planetary gearsets, and ring gears of the third and fourth simple planetary gearsets are variably connected to both a planet carrier of the first simple planetary gearset, and to the ring gears of the first and second simple planetary gearsets.

28. The powertrain of claim 16, wherein the sun gear of the second simple planetary gearset is fixedly connected to planet carriers of the third and fourth simple planetary gearsets, and ring gears of the third and fourth simple planetary gearsets are variably connected to both a planet carrier of the first simple planetary gearset, and to ring gears of the first and second simple planetary gearsets.

29. The powertrain of claim 1, wherein the first compound planetary gearset is realized through a combination of the first and second simple planetary gearset, both of which are double pinion planetary gearsets, and the second compound planetary gearset is realized through a combination of the third simple planetary gearset, which is a single pinion planetary gearset, with the fourth simple planetary gearset, which is a double pinion planetary gearset.

30. The powertrain of claim 18, wherein a sun gear and a ring gear of the first simple planetary gearset are fixedly connected respectively to a planet carrier and a ring gear of the second simple planetary gearset.

31. The powertrain of claim 18, wherein a sun gear and a ring gear of the third simple planetary gearset are fixedly connected respectively to a sun gear and a ring gear of the fourth simple planetary gearset.

32. The powertrain of claim 19, wherein a sun gear of the second simple planetary gearset is fixedly connected to a planet carrier of the third simple planetary gearset, and ring gears of the third and fourth simple planetary gearsets are variably connected to both a planet carrier of the first simple planetary gearset, and to the ring gears of the first and second simple planetary gearsets.

33. The powertrain of claim 20, wherein a sun gear of the second simple planetary gearset is fixedly connected to a planet carrier of the third simple planetary gearset, and the ring gears of the third and fourth simple planetary gearsets are variably connected to both a planet carrier of the first simple planetary gearset, and to ring gears of the first and second simple planetary gearsets.

34. The powertrain of claim 18, wherein a planet carrier and a ring gear of the third simple planetary gearset are fixedly connected respectively to a ring gear and a sun gear of the second simple planetary gearset.

35. The powertrain of claim 18, wherein sun gears of the first and second simple planetary gearsets are fixedly connected to both a planet carrier of the third and a ring gear of the fourth simple planetary gearsets, and a planet carrier of the fourth simple planetary gearset is variably connected to both a planet carrier of the first simple planetary gearset, and to ring gears of the first and second simple planetary gearsets.

36. The powertrain of claim 19, wherein sun gears of the first and second simple planetary gearsets are fixedly connected to both a planet carrier of the third and a ring gear of the fourth simple planetary gearsets, and a planet carrier of the fourth simple planetary gearset is variably connected to both a planet carrier of the first simple planetary gearset, and to the ring gears of the first and second simple planetary gearsets.

37. The powertrain of claim 22, wherein sun gears of the first and second simple planetary gearsets are fixedly connected to both the planet carrier of the third and the ring gear of the fourth simple planetary gearsets, and a planet carrier of the fourth simple planetary gearset is variably connected to both a planet carrier of the first simple planetary gearset, and to ring gears of the first and second simple planetary gearsets.

38. The powertrain of claim 2, wherein a sun gear and a planet carrier of the third simple planetary gearset are fixedly connected respectively to a planet carrier and a ring gear of the fourth simple planetary gearset.

39. The powertrain of claim 18, wherein a sun gear of the second simple planetary gearset is fixedly connected to a ring gear of the fourth simple planetary gearset, and both a planet carrier and a ring gear of the third and fourth simple planetary gearsets are variably connected to both a planet carrier of the first simple planetary gearset, and to ring gears of the first and second simple planetary gearsets.

40. The powertrain of claim 19, wherein a sun gear of the second simple planetary gearset is fixedly connected to a ring gear of the fourth simple planetary gearset, and both a planet carrier and a ring gear of the third and fourth simple planetary gearsets are variably connected to both a planet carrier of the first simple planetary gearset, and to the ring gears of the first and second simple planetary gearsets.

41. The powertrain of claim 24, wherein a sun gear of the second simple planetary gearset is fixedly connected to the ring gear of the fourth simple planetary gearset, and both the planet carrier and ring gear of the third and fourth simple planetary gearsets are variably connected to both a planet carrier of the first simple planetary gearset, and to ring gears of the first and second simple planetary gearsets.

42. The powertrain of claim 1, wherein the first compound planetary gearset is realized through a combination of the first and second simple planetary gearsets, both of which are double pinion planetary gearsets, and the second compound planetary gearset is realized through a combination of the third and fourth compound planetary gearsets, both of which are single pinion planetary gearsets.

43. The powertrain of claim 25, wherein a sun gear and a ring gear of the first simple planetary gearset are fixedly connected respectively to a planet carrier and a ring gear of the second simple planetary gearset.

44. The powertrain of claim 25, wherein a sun gear and a planet carrier of the third simple planetary gearset are fixedly connected respectively to a ring gear and a planet carrier of the fourth simple planetary gearset.

45. The powertrain of claim 25, wherein a sun gear of the second simple planetary gearset is fixedly connected to planet carriers of the third and fourth simple planetary gearsets, and a ring gear of the third simple planetary gearset is variably connected to both a planet carrier of the first simple planetary gearset, and to ring gears of the first and second simple planetary gearsets.

46. The powertrain of claim 26, wherein a sun gear of the second simple planetary gearset is fixedly connected to planet carriers of the third and fourth simple planetary gearsets, and a ring gear of the third simple planetary gearset is variably connected to both a planet carrier of the first simple planetary gearset, and to the ring gears of the first and second simple planetary gearsets.

47. The powertrain of claim 27, wherein a sun gear of the second simple planetary gearset is fixedly connected to the planet carriers of the third and fourth simple planetary gearsets, and a ring gear of the third simple planetary gearset is variably connected to both a planet carrier of the first simple planetary gearset, and to ring gears of the first and second simple planetary gearsets.

48. The powertrain of claim 2, wherein a planet carrier and a ring gear of the third simple planetary gearset are fixedly connected respectively to a ring gear and a planet carrier of the fourth simple planetary gearset.

49. The powertrain of claim 25, wherein a sun gear of the second simple planetary gearset is fixedly connected to a planet carrier of the third and a ring gear of the fourth simple planetary gearsets, and both a ring gear of the third and a planet carrier of the fourth simple planetary gearsets are variably connected to both a planet carrier of the first simple planetary gearset, and to ring gears of the first and second simple planetary gearsets.

50. The powertrain of claim 26, wherein a sun gear of the second simple planetary gearset is fixedly connected to a planet carrier and a ring gear of the third and fourth simple planetary gearsets, and both a ring gear of the third and a planet carrier of the fourth simple planetary gearsets are variably connected to both a planet carrier of the first simple planetary gearset, and to the ring gears of the first and second simple planetary gearsets.

51. The powertrain of claim 29, wherein a sun gear of the second simple planetary gearset is fixedly connected to the planet carrier of the third and the ring gear of the fourth simple planetary gearsets, and both the ring gear of the third and the planet carrier of the fourth simple planetary gearsets are variably connected to both a planet carrier of the first simple planetary gearset, and to ring gears of the first and second simple planetary gearsets.

52. The powertrain of claim 1, wherein the first compound planetary gearset is realized through a combination of the first simple planetary gearset, which is a double pinion planetary gearset, with the second simple planetary gearset, which is a single pinion planetary gearset; and the second compound planetary gearset is realized through a combination of the third and fourth simple planetary gearsets, both of which are single pinion planetary gearsets.

53. The powertrain of claim 31, wherein a planet carrier and a ring gear of the first simple planetary gearset are fixedly connected respectively to a planet carrier and a sun gear of the second simple planetary gearset.

54. The powertrain of claim 31, wherein a sun gear and a planet carrier of the third simple planetary gearset are fixedly connected respectively to a ring gear and a planet carrier of the fourth simple planetary gearset.

55. The powertrain of claim 31, wherein a ring gear of the second simple planetary gearset is fixedly connected to planet carriers of the third and fourth simple planetary gearsets, and a ring gear of the third simple planetary gearset is variably connected to both planet carriers of the first and second simple planetary gearsets, and to a ring gear of the first and a sun gear of the second simple planetary gearsets.

56. The powertrain of claim 32, wherein a ring gear of the second simple planetary gearset is fixedly connected to planet carriers of the third and fourth simple planetary gearsets, and a ring gear of the third simple planetary gearset is variably connected to both the planet carriers of the first and second simple planetary gearsets, and to the ring gear and sun gear of the first and second simple planetary gearsets.

57. The powertrain of claim 33, wherein a ring gear of the second simple planetary gearset is fixedly connected to the planet carriers of the third and fourth simple planetary gearsets, and a ring gear of the third simple planetary gearset is variably connected to both planet carriers of the first and second simple planetary gearsets, and to a ring gear and a sun gear of the first and second simple planetary gearsets.

58. The powertrain of claim 31, wherein a planet carrier and a ring gear of the third simple planetary gearset are fixedly connected respectively to a ring gear and a planet carrier of the fourth simple planetary gearset.

59. The powertrain of claim 31, wherein a ring gear of the second simple planetary gearset is fixedly connected to a planet carrier of the third and a ring gear of the fourth simple planetary gearsets, and both a ring gear of the third and a planet carrier of the fourth simple planetary gearsets are variably connected to both planet carriers of the first and second simple planetary gearsets, and to a ring gear of the first and a sun gear of the second simple planetary gearsets.

60. The powertrain of claim 32, wherein a ring gear of the second simple planetary gearset is fixedly connected to a planet carrier of the third and a ring gear of the fourth simple planetary gearsets, and both a ring gear of the third and a planet carrier of the fourth simple planetary gearsets are variably connected to both the planet carriers of the first and second simple planetary gearsets, and to the ring gear of the first and the sun gear of the second simple planetary gearsets.

61. The powertrain of claim 35, wherein a ring gear of the second simple planetary gearset is fixedly connected to the planet carrier of the third and the ring gear of the fourth simple planetary gearsets, and both the ring gear of the third and the planet carrier of the fourth simple planetary gearsets are variably connected to both planet carriers of the first and second simple planetary gearsets, and to a ring gear of the first and a sun gear of the second simple planetary gearsets.

62. The powertrain of claim 1, wherein the first compound planetary gearset is realized through a combination of the first simple planetary gearset, which is a double pinion planetary gearset, with the second simple planetary gearset, which is a single pinion planetary gearset; and the second compound planetary gearset is realized through a combination of the third simple planetary gearset, which is a single pinion planetary gearset, with the fourth simple planetary gearset, which is a double pinion planetary gearset.

63. The powertrain of claim 37, wherein a planet carrier and a ring gear of the first simple planetary gearset are fixedly connected respectively to a planet carrier and a sun gear of the second simple planetary gearset.

64. The powertrain of claim 37, wherein a sun gear and a ring gear of the third simple planetary gearset are fixedly connected respectively to a sun gear and a ring gear of the fourth simple planetary gearset.

65. The powertrain of claim 37, wherein ring gears of the first and second simple planetary gearsets are fixedly connected to a planet carrier of the third simple planetary gearset, and ring gears of the third and fourth simple planetary gearsets are variably connected to both planet carriers of the first and second simple planetary gearsets, and to a ring gear of the first and a sun gear of the second simple planetary gearspts.

66. The powertrain of claim 38, wherein ring gears of the first and second simple planetary gearsets are fixedly connected to a planet carrier of the third simple planetary gearset, and ring gears of the third and fourth simple planetary gearsets are variably connected to both the planet carriers of the first and second simple planetary gearsets, and to the ring gear of the first and the sun gear of the second simple planetary gearsets.

67. The powertrain of claim 39, wherein ring gears of the first and second simple planetary gearsets are fixedly connected to a planet carrier of the third simple planetary gearset, and the ring gears of the third and fourth simple planetary gearsets are variably connected to both planet carriers of the first and second simple planetary gearsets, and to a ring gear of the first and a sun gear of the second simple planetary gearsets.

68. The powertrain of claim 37, wherein a planet carrier and a ring gear of the third simple planetary gearset are fixedly connected respectively to a ring gear and a sun gear of the second simple planetary gearset.

69. The powertrain of claim 37, wherein a ring gear of the second simple planetary gearset is fixedly connected to a planet carrier of the third and a ring gear of the fourth simple planetary gearsets, and a planet carrier of the fourth simple planetary gearset is variably connected to planet carriers of the first and second simple planetary gearsets, and to a ring gear of the first and a sun gear of the second simple planetary gearsets.

70. The powertrain of claim 39, wherein a ring gear of the second simple planetary gearset is fixedly connected to a planet carrier of the third and the ring gear of the fourth simple planetary gearsets, and a planet carrier of the fourth simple planetary gearset is variably connected to planet carriers of the first and second simple planetary gearsets, and to a ring gear of the first and a sun gear of the second simple planetary gearsets.

71. The powertrain of claim 41, wherein the ring gear of the second simple planetary gearset is fixedly connected to the planet carrier of the third and a ring gear of the fourth simple planetary gearsets, and a planet carrier of the fourth simple planetary gearset is variably connected to planet carriers of the first and second simple planetary gearsets, and to a ring gear of the first and the sun gear of the second simple planetary gearsets.

72. The powertrain of claim 37, wherein a sun gear and a planet carrier of the third simple planetary gearset are fixedly connected respectively to a planet carrier and a ring gear of the fourth simple planetary gearset.

73. The powertrain of, claim 37, wherein a ring gear of the second simple planetary gearset is fixedly connected to a ring gear of the fourth simple planetary gearset, and both a planet carrier of the third and a ring gear of the fourth simple planetary gearsets are variably connected to planet carriers of the first and second simple planetary gearsets, and to a ring gear of the first and a sun gear of the second simple planetary gearsets.

74. The powertrain of claim 38, wherein a ring gear of the second simple planetary gearset is fixedly connected to a ring gear of the fourth simple planetary gearset, and both a planet carrier of the third and the ring gear of the fourth simple planetary gearsets are variably connected to planet carriers of the first and second simple planetary gearsets, and to the ring gear of the first and the sun gear of the second simple planetary gearsets.

75. The powertrain of claim 43, wherein a ring gear of the second simple planetary gearset is fixedly connected to the ring gear of the fourth simple planetary gearset, and both the planet carrier of the third and the ring gear of the fourth simple planetary gearsets are variably connected to planet carriers of the first and second simple planetary gearsets, and to a ring gear of the first and a sun gear of the second simple planetary gearsets.

76. The powertrain of claim 1, wherein the first compound planetary gearset is realized through a combination of the first simple planetary gearset, which is a double pinion planetary gearset, with the second simple planetary gearset, which is a single pinion planetary gearset; and the second compound planetary gearset is realized through a combination of the third simple planetary gearset, which is a double pinion planetary gearset, with the fourth simple planetary gearset, which is a single pinion planetary gearset.

77. The powertrain of claim 46, wherein a planet carrier and a ring gear of the first simple planetary gearset are fixedly connected respectively to a planet carrier and a sun gear of the second simple planetary gearset.

78. The powertrain of claim 45, wherein a planet carrier and a ring gear of the third simple planetary gearset are fixedly connected respectively to a planet carrier and a ring gear of the fourth simple planetary gearset.

79. The powertrain of claim 45, wherein ring gears of the first and second simple planetary gearsets are fixedly connected to ring gears of the third and fourth simple planetary gearsets, and planet carriers of the third and fourth simple planetary gearsets are variably connected to both planet carriers of the first and second simple planetary gearsets, and to the ring gear of the first and a sun gear of the second simple planetary gearsets.

80. The powertrain of claim 46, wherein ring gears of the first and second simple planetary gearsets are fixedly connected to ring gears of the third and fourth simple planetary gearsets, and planet carriers of the third and fourth simple planetary gearsets are variably connected to both the planet carriers of the first and second simple planetary gearsets, and to the ring gear of the first and the sun gear of the second simple planetary gearsets.

81. The powertrain of claim 47, wherein ring gears of the first and second simple planetary gearsets are fixedly connected to the ring gears of the third and fourth simple planetary gearsets, and the planet carriers of the third and fourth simple planetary gearsets are variably connected to both planet carriers of the first and second simple planetary gearsets, and to the ring gear of the first and a sun gear of the second simple planetary gearsets.

82. The powertrain of claim 45, wherein a planet carrier and a ring gear of the third simple planetary gearset are fixedly connected respectively to a planet carrier and a ring gear of the second simple planetary gearset.

83. The powertrain of claim 46, wherein ring gears of the first and second simple planetary gearsets are fixedly connected to a planet carrier of the third simple planetary gearset, and ring gears of the third and fourth simple planetary gearsets are variably connected to both planet carriers of the first and second simple planetary gearsets, and

39 to the ring gear of the first and the sun gear of the second simple planetary gearsets.

84. The powertrain of claim 45, wherein ring gears of the first and second simple planetary gearsets are fixedly connected to the planet carrier of the third simple planetary gearset, and ring gears of the third and fourth simple planetary gearsets are variably connected to both planet carriers of the first and second simple planetary gearsets, and to the ring gear of the first and a sun gear of the second simple planetary gearsets.

85. The powertrain of claim 45, wherein ring gears of the first and second simple planetary gearsets are fixedly connected to planet carriers of the third and fourth simple planetary gearsets, and ring gears of the third and fourth simple planetary gearsets are variably connected to both planet carriers of the first and second simple planetary gearsets, and to the ring gear of the first and a sun gear of the second simple planetary gearsets.

86. The powertrain of claim 46, wherein ring gears of the first and second simple planetary gearsets are fixedly connected to planet carriers of the third and fourth simple planetary gearsets, and ring gears of the third and fourth simple planetary gearsets are variably connected to both the planet carriers of the first and second simple planetary gearsets, and to the ring gear of the first and the sun gear of the second simple planetary gearsets.

87. The powertrain of claim 51, wherein ring gears of the first and second simple planetary gearsets are fixedly connected to planet carriers of the third and fourth simple planetary gearsets, and ring gears of the third and fourth simple planetary gearsets are variably connected to both planet carriers of the first and second simple planetary gearsets, and to the ring gear of the first and the sun gear of the second simple planetary gearsets.

88. The powertrain of claim 1, wherein the first compound planetary gearset is realized through a combination of the first simple planetary gearset, which is a double pinion planetary gearset, with the second simple planetary gearset, which is a single pinion planetary gearset; and the second compound planetary gearset is realized through a combination of the third and fourth simple planetary gearsets, which are double pinion planetary gearsets.

89. The powertrain of claim 53, wherein a sun gear and a ring gear of the third simple planetary gearset are fixedly connected respectively to a planet carrier and a ring gear of the fourth simple planetary gearset.

90. The powertrain of claim 53, wherein a ring gear of the second simple planetary gearset is fixedly connected to a planet carrier of the third simple planetary gearset, and ring gears of the third and fourth simple planetary gearsets are variably connected to both planet carriers of the first and second simple planetary gearsets, and to a ring gear of the first and a sun gear of the second simple planetary gearsets.

91. The powertrain of claim 54, wherein a ring gear of the second simple planetary gearset is fixedly connected to a planet carrier of the third simple planetary gearset, and ring gears of the third and fourth simple planetary gearsets are variably connected to both the planet carriers of the first and second simple planetary gearsets, and to the ring gear of the first and the sun gear of the second simple planetary gearsets.

92. The powertrain of claim 55, wherein a ring gear of the second simple planetary gearset is fixedly connected to a planet carrier of the third simple planetary gearset, and the ring gears of the third and fourth simple planetary gearsets are variably connected to both planet carriers of the first and second simple planetary gearsets, and to a ring gear of the first and a sun gear of the second simple planetary gearsets.

93. The powertrain of claim 53, wherein a sun gear and a planet carrier of the third simple planetary gearset are fixedly connected respectively to a sun gear and a ring gear of the second simple planetary gearset.

94. The powertrain of claim 53, wherein a ring gear of the second simple planetary gearset is fixedly connected to a ring gear of the third simple planetary gearset, and a planet carrier of the third and a ring gear of the fourth simple planetary gearsets are variably connected to both planet carriers of the first and second simple planetary gearsets, and to a ring gear of the first and a sun gear of the second simple planetary gearsets.

95. The powertrain of claim 54, wherein a ring gear of the second simple planetary gearset is fixedly connected to a ring gear of the third simple planetary gearset, and a planet carrier of the third and a ring gear of the fourth simple planetary gearsets are variably connected to both the planet carriers of the first and second simple planetary gearsets, and to the ring gear of the first and the sun gear of the second simple planetary gearsets.

96. The powertrain of claim 57, wherein the ring gear of the second simple planetary gearset is fixedly connected to a ring gear of the third simple planetary gearset, and the planet carrier of the third and a ring gear of the fourth simple planetary gearsets are variably connected to both planet carriers of the first and second simple planetary gearsets, and to a ring gear of the first and the sun gear of the second simple planetary gearsets.

97. The powertrain of claim 53, wherein a planet carrier and a ring gear of the third simple planetary gearset are fixedly connected respectively to a ring gear and a planet carrier of the second simple planetary gearset.

98. The powertrain of claim 53, wherein ring gears of the first and second simple planetary gearset are fixedly connected to a planet carrier of the third and a ring gear of the fourth simple planetary gearsets, and a ring gear of the third and a planet carrier of the fourth simple planetary gearsets are variably connected to both planet carriers of the first and second simple planetary gearsets, and to the ring gear of the first and a sun gear of the second simple planetary gearsets.

99. The powertrain of claim 54, wherein ring gears of the first and second simple planetary gearset are fixedly connected to a planet carrier of the third and a ring gear of the fourth simple planetary gearsets, and a ring gear of the third and a planet carrier of the fourth simple planetary gearsets are variably connected to both the planet carriers of the first and second simple planetary gearsets, and to the ring gear of the first and the sun gear of the second simple planetary gearsets.

100. The powertrain of claim 59, wherein ring gears of the first and second simple planetary gearset are fixedly connected to the planet carrier of the third and a ring gear of the fourth simple planetary gearsets, and a ring gear of the third and a planet carrier of the fourth simple planetary gearsets are variably connected to both planet carriers of the first and second simple planetary gearsets, and to the ring gear of the first and the sun gear of the second simple planetary gearsets.

* * * * *

UNITED STATES PATENT AND TRADEMARK OFFICE
CERTIFICATE OF CORRECTION

PATENT NO. : 5,989,148
DATED : November 23, 1999
INVENTORS : Jongsool PARK

It is certified that error appears in the above-identified patent and that said Letters Patent is hereby corrected as shown below:

Claim 77, column 38, line 26, change "claim 46" to --Claim 45--.

Signed and Sealed this

Thirtieth Day of May, 2000

Attest:

Q. TODD DICKINSON

*Attesting Officer*               *Director of Patents and Trademarks*